(12) United States Patent
Bitar

(10) Patent No.: US 10,994,841 B2
(45) Date of Patent: May 4, 2021

(54) ELECTRIC JETPACK DEVICE

(71) Applicant: Peter Bitar, Anderson, IN (US)

(72) Inventor: Peter Bitar, Anderson, IN (US)

( * ) Notice: Subject to any disclaimer, the term of this patent is extended or adjusted under 35 U.S.C. 154(b) by 42 days.

(21) Appl. No.: 16/517,632

(22) Filed: Jul. 21, 2019

(65) Prior Publication Data

US 2020/0023970 A1 Jan. 23, 2020

Related U.S. Application Data

(60) Provisional application No. 62/701,731, filed on Jul. 21, 2018.

(51) Int. Cl.
*B64C 39/02* (2006.01)

(52) U.S. Cl.
CPC .................................. *B64C 39/026* (2013.01)

(58) Field of Classification Search
CPC . B64C 39/026; B64C 27/20; B64C 2201/042; B64C 2201/108
See application file for complete search history.

(56) References Cited

U.S. PATENT DOCUMENTS

| | | | |
|---|---|---|---|
| 2,726,829 A | 12/1955 | Hillis | |
| 3,243,144 A | 3/1966 | Hulbert et al. | |
| 6,488,232 B2 | 12/2002 | Moshier | |
| 9,440,736 B2 | 9/2016 | Bitar | |
| 10,364,028 B1 * | 7/2019 | Wilhour | B64C 27/00 |
| 2002/0003188 A1 * | 1/2002 | Moshier | B64C 39/026 244/4 R |
| 2007/0290097 A1 | 12/2007 | Ishiba | |
| 2009/0020654 A1 * | 1/2009 | Tyler | B64C 39/026 244/23 A |
| 2014/0219784 A1 | 8/2014 | Nourollah | |
| 2016/0123182 A1 * | 5/2016 | Samaritano | B64C 39/024 416/1 |
| 2017/0015419 A1 * | 1/2017 | Tyler | B64C 39/026 |

FOREIGN PATENT DOCUMENTS

| | | |
|---|---|---|
| CN | 102485593 A | 6/2012 |
| CN | 102627147 A | 8/2012 |

* cited by examiner

*Primary Examiner* — Rodney A Bonnette
(74) *Attorney, Agent, or Firm* — Ritchison Law Offices, PC; John D Ritchison

(57) ABSTRACT

The Electric Jetpack Device has multiple electric ducted or clustered electric jets to create enough/sufficient controlled thrust with battery power alone. It is a lightweight vertical take-off with the electrical power of rechargeable batteries for a safe, vertical lift off vehicle. It is capable of carrying an average human or equivalent payload and flying for several minutes per charge. Motors and propellers are powered by the batteries and managed through an Electronic Speed Controller and a flight controller. The Flight Controller balances thrust and limits roll from side to side. By moving the control handles connected and mounted to an aluminum frame, the device and craft is directed. The pivots tilt the cluster of jetpacks slightly forward or back. The frame is connected to a harness, in which the pilot is strapped. The craft is modular and can be connected to another craft creating a "quadcopter" set-up.

20 Claims, 13 Drawing Sheets

33, 31

34, 31

32, 31

35, 31

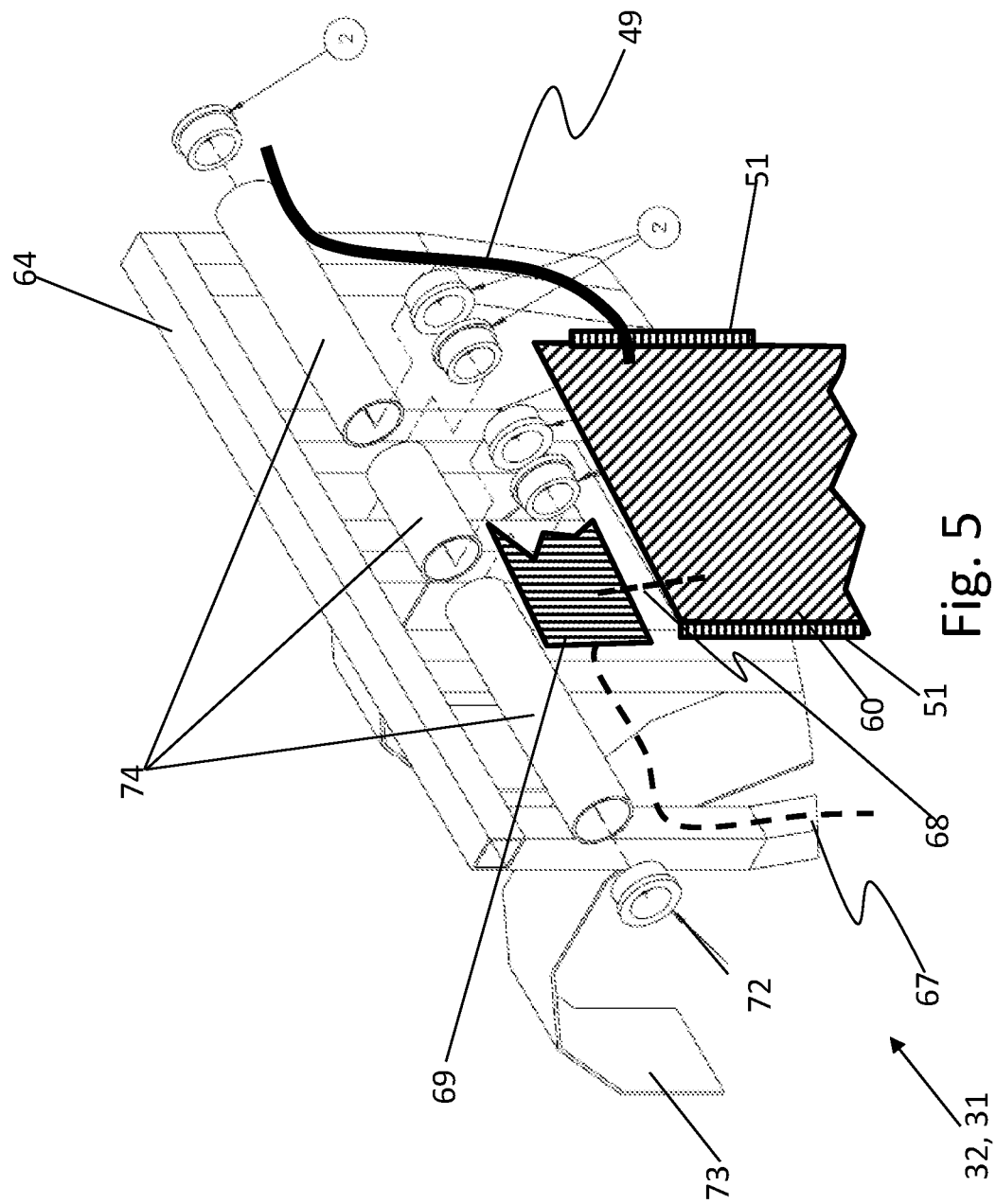

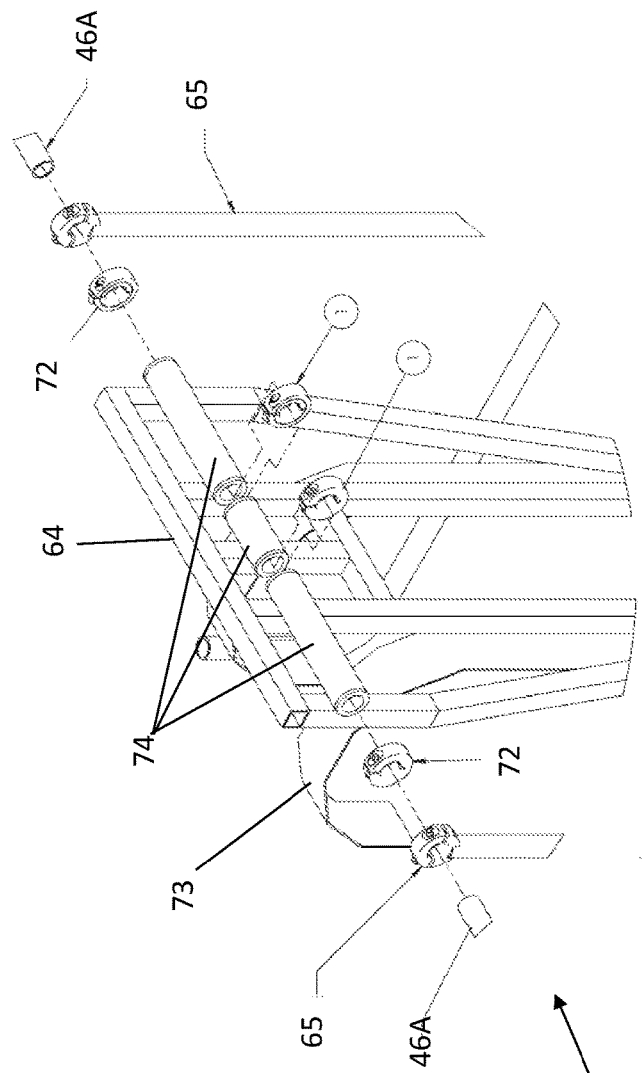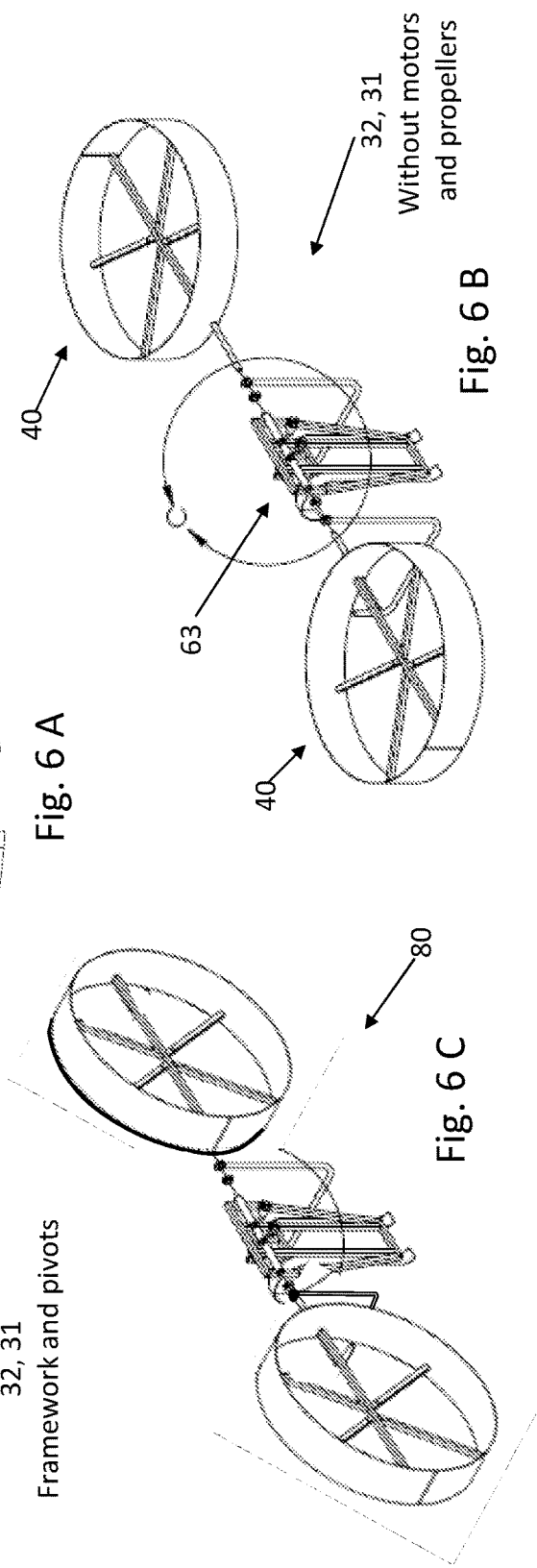

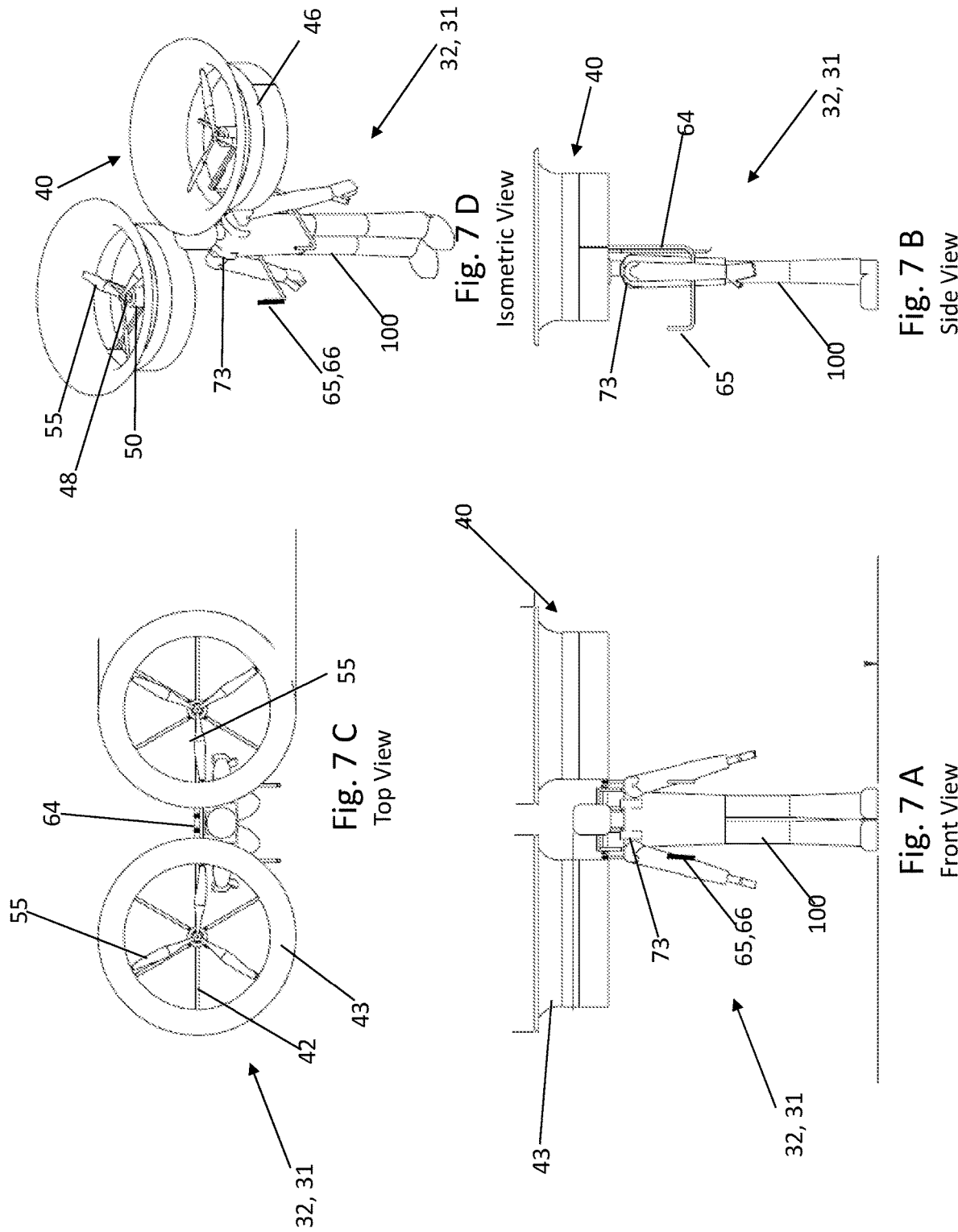

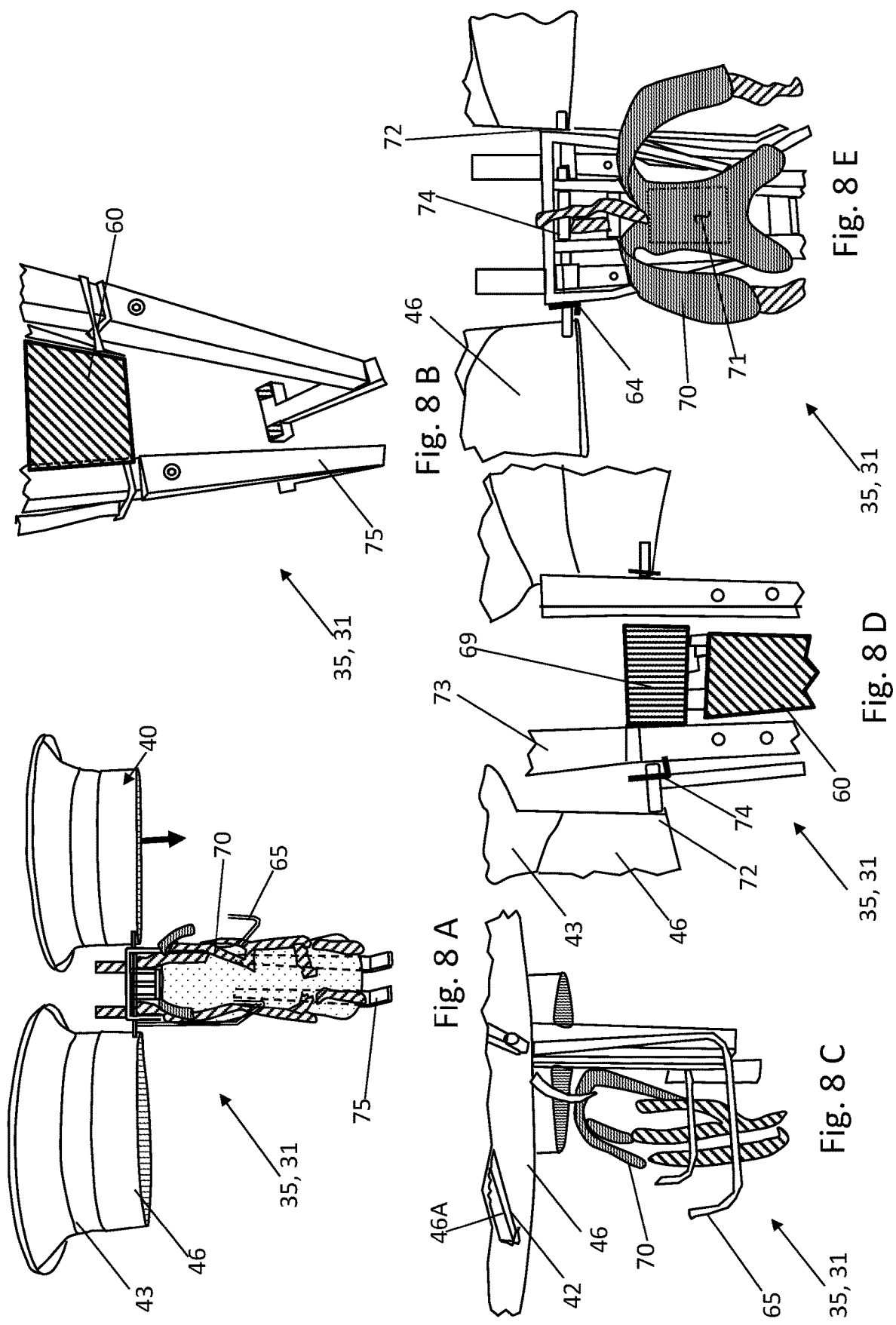

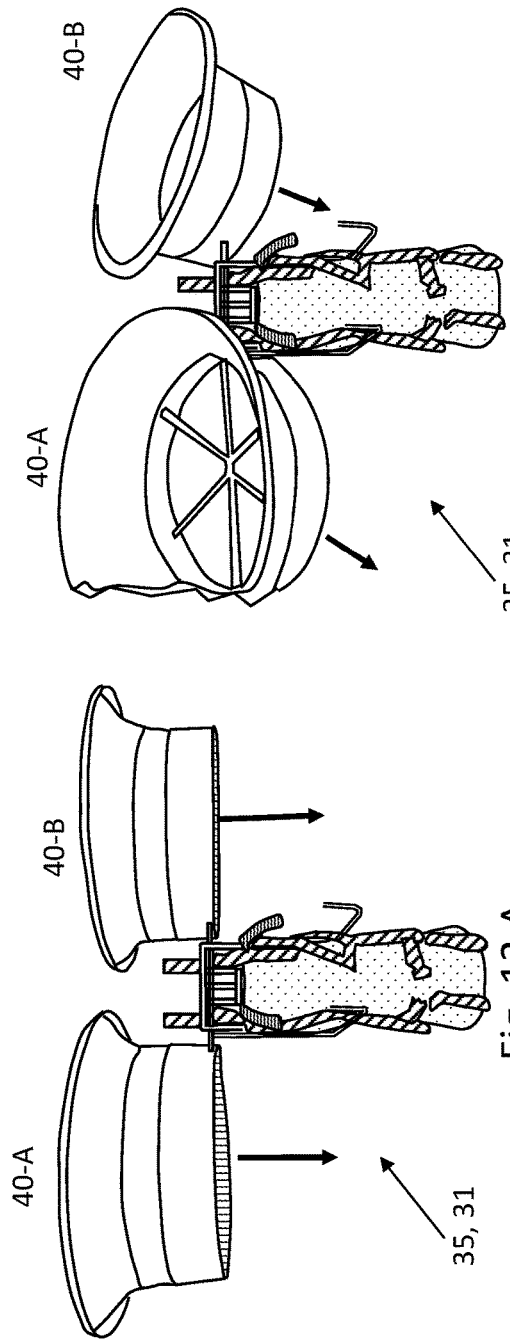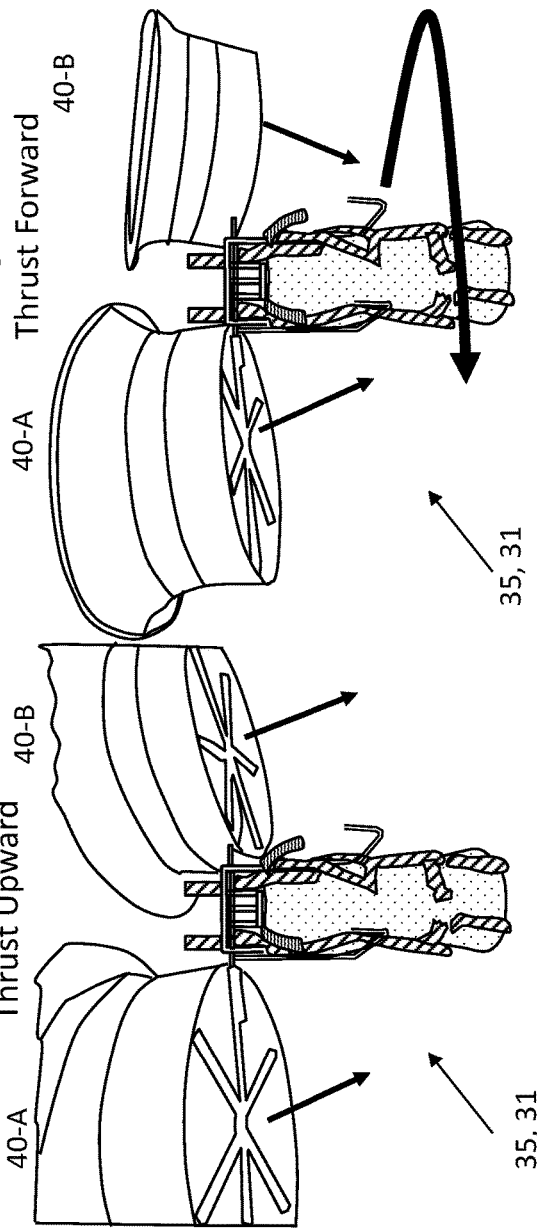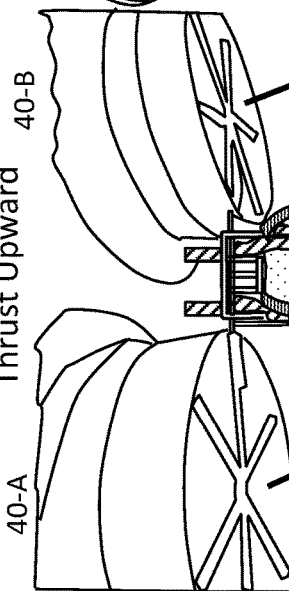

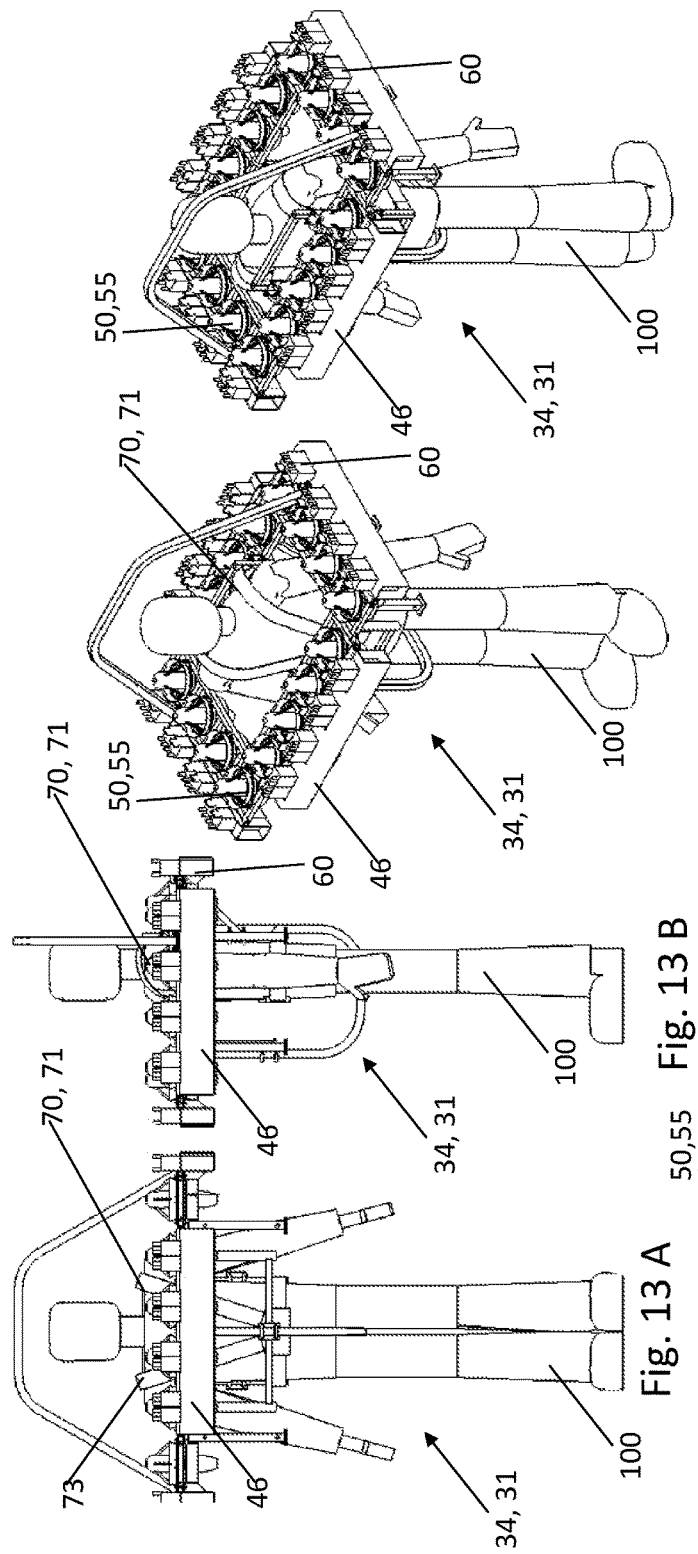
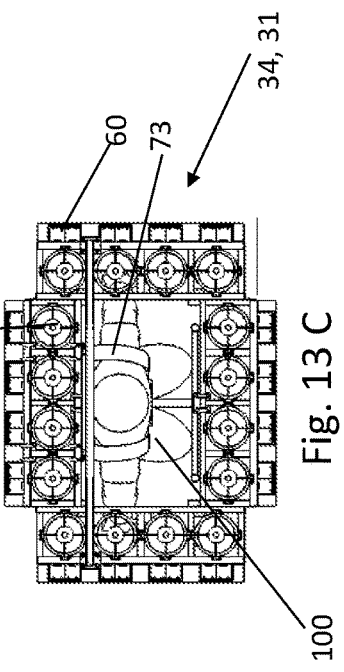
Fig. 13 A  Fig. 13 B  Fig. 13 C  Fig. 13 D  Fig. 13 E

ELECTRIC JETPACK DEVICE

CROSS-REFERENCE TO RELATED APPLICATIONS

This application claims the benefit of United States Provisional Patent Application with Ser. No. 62/701,731 filed Jul. 21, 2018, by Pete Bitar. The application was entitled "An Electric Jetpack Device".

FIELD OF INVENTION

This Electric JetPack device invention relates to powered aircraft. A one-person-carrying electric, using a belt-like cluster of small, multiple electric JetPack thrusters, side-by-side ducted thrusters, vertical-takeoff-and-landing (VTOL), aircraft for individual transportation. More particularly, the device relates to relatively small, lighter weight powered aircraft capable of vertical take-offs and propulsion across various terrain at low altitudes. This invention relates to a propulsion device which is capable to lifting and/or propelling a person or an aircraft, such as a helicopter or an airplane, through the air. The uniqueness of the device is its capability of using electrical power from batteries to propel a person into flight with vertical take-off. This design covers all such oriented electric manned aircraft, with partial manual and partial electronic control. The device has several optional features which are explained within this application. For example, but not as a limitation, the system uses a belt-like cluster of small, multiple electric JetPack thrusters ducted fans made of carbon fiber for light weight and strength but can also be fabricated from a variety of other materials. The system is capable of being carried by an average human, or mounted to landing skids, and is capable of flying for several minutes per charge, depending on the number of batteries and energy density of the batteries being carried.

FEDERALLY SPONSORED RESEARCH

Not Applicable.

SEQUENCE LISTING OR PROGRAM

Not Applicable.

BACKGROUND—FIELD OF INVENTION AND PRIOR ART

An extensive search for similar devices yielded no remarkable results. As far as known, there are no Electric JetPack Devices or the like that are functionally equivalent. Further none demonstrate the electrical power from batteries in a lightweight, belt-like cluster of small, multiple electric JetPack thrusters or framework and ducted propellers to propel a person into flight with vertical take-off integral wind turbine recharging capability. It is believed that this product is unique in its design and technologies.

In the early 1960 years jetpacks were developed with which a single person can move the fly. Disadvantage of this, devices based on the reaction principle is the very short flight time, the high energy consumption and the fact that due to the strong development of heat, the pilot must wear insulating protective clothing. In addition, the pilot has a defect in the drive had no opportunity to land controlled. Vertical take-off end of aircraft, such as helicopters belong to the rotorcraft. In this case, generated by one or more motor-driven rotary-wing lift and propulsion. The operation of a modern helicopter is significantly more expensive compared to a fixed-wing aircraft with comparable payload. Therefore, the usual fields of application limited to military purposes and the area of air rescue.

Today, there are vertical take-off and propulsion mechanisms. Some are relatively small and are designed to be strapped onto a person's back while others are larger and can be used to power an aircraft, such as a helicopter or an airplane. A small power pack used to lift a person is sometimes referred to as a jetpack. Jetpacks usually include some kind of motor or engine which can utilize air velocity or water velocity to lift and propel a person through the air. Some propulsion mechanisms can utilize a power driven shaft with radiating blades, propellers, vanes, wings, etc. placed so as to thrust air or water in a desired direction when spinning to generate sufficient force to lift and propel a person through the air. Many of these devices operate on fossil fuels, such as hydrogen, gasoline, propane or high-octane jet fuel, while others infrequently rely on electrical batteries.

Regardless of the different designs, there is constant effort by engineers to create a more efficient propulsion mechanism. Thus, the need exists to provide a simple and cost-effective VTOL aircraft for at least one person. Now a propulsion mechanism has been invented which can generate sufficient lift and mobility to propel a person or an aircraft, such as a helicopter or an airplane, through the air in an efficient and cost-effective manner.

Problems Solved

The problems solved and addressed by this JetPack device in view of other small air transport vehicles strapped to individuals are many: The JetPack allows an operator to easily transport and propel himself and/or a payload at low altitudes across various terrains. The JetPack has multiple electric ducted or clustered electric jets to create enough/sufficient controlled thrust with battery power alone. In addition, the device with its turbines is electric powered and not powered by combustible fuels so there is virtually no dealing with heat, exhaust, and noise with these clustered small electric JetPacks. Further, the device is wearable by an individual and fully portable. It has ducts that assist in thrust and protect pilot from open blade hazards—so provides safe wearability as compared to many other current Electric Vertical Take Off and Landing (EVTOL) personal crafts. It can also be recharged at a remote location with the rotatable turbines and motor-generator. Further, it can be utilized as a Search and Rescue vehicle to locate lost or help remote victims. I can have multiple thrust systems which are clustered for redundancy and configuration. A feature around the turbines includes a safe, Kevlar shroud for the turbine ducts. Design-wise it has a good percentage thrust over load to permit better control. It can modularize for more persons or cargo

Prior Art

As far as known, there are no Electric powered, personal JetPack devices or the like. It is believed that this product is unique in its design and technologies. A novelty search revealed:

A. The US patent application 2002/0003188 and U.S. Pat. No. 6,488,232 by Moshier submitted entitled Single passenger aircraft shows a single passenger aircraft configured to vertically take-off and land. An airframe is configured to support the passenger in an upright position during take-off and landing and during flight. The aircraft includes a pair of propulsion devices that are mounted on an airframe above the level of the pilot. A set of hand operated control devices are mechanically linked to the propulsion devices for varying the orientation of the propulsion devices during flight.

B. U.S. Pat. No. 3,243,144 by Hulbert was issued in 1966 for a Personal Propulsion Unit. This taught a Propulsion unit for rendering an individual airborn including a torso engaging portion, nozzles, thrust units and components under the armpits of a user.

C. Another U.S. Patent Application 2007/0290097 called a Vertical Takeoff and Landing Unit 90277306 was provided by Ishiba in 2007. This invention showed an object of the invention is to prevent non-uniformity in the temperature distribution from occurring in a tip turbine fan in a vertical take-off and landing aircraft that uses the tip turbine fan as a source of thrust. In a vertical take-off and landing aircraft provided with a tip turbine fan in which a fan is rotated by blowing, in an annular turbine chamber provided around a rotation shaft of the fan at the center, compressed gas to a tip turbine attached to the fan to enable vertical take-off and landing, three or more compressed gas intake ports for supplying compressed gas to said turbine chamber are provided at regular intervals along the circumference of the turbine chamber.

D. U.S. Patent Application 20140219784 was submitted by Nourollah in 2014 for a Propulsion device. Here is demonstrated a propulsion device is disclosed which is capable of lifting and/or propelling a person or an aircraft, such as a helicopter or airplane, through the air.

E. A U.S. Pat. No. 2,726,829 was issued to Hillis in 1955 for a Circular Wing Aircraft. This is an aircraft having a circular fixed wing and aileron and rudder for the same, the ailerons and rudder being at the periphery of the wing the ailerons being equally spaced about said periphery, a source of power at the center of said wing, a pair of contra-rotated blowers operated by said power source and arranged to force air out over the upper wing surface, slots in the upper surface of the wing for allowing a flow of air inwardly through said wing to said power source and to one of said blowers, a portion of said flow of air being employed for fuel combustion in the power source, a support depending from said power source, a cabin space surrounding said support, and landing wheels for supporting the cabin and entire structure from below, the exhaust from the engine being radially outwardly over the upper wing surface, and wherein substantially all of the air for blower and engine operation is drawn in from the top of the craft.

F. A Chinese application CN102485593 was published in 2010. This demonstrated a lift device floated one-seater jetpack. A power rotor apparatus or a culvert pipe propeller apparatus generating upward lifting force is connected to a pack rack through a link rod, and the power/lift device accounting for most of the structural weight will not effect on a user directly before departure and after landing, therefore the user will not be bound up by the power/lift device and feels no weight bearing; as a head is far from an engine and a rotor that generate vibration and noise, flight quality is improved. Stability of a device during departure, landing and ground placement does not need to be considered like an existing device, so as to avoid abuse of large support of the existing device, save a lot of structural weight and create conditions for reducing aircraft cost and improving thrift for usage. And, G. Finally, another Chinese application CN102627147 published in 2012 describes a One-man flight vehicle being capable of lifting vertically and provided with fixed wings. It discloses a wearing type one-man flight vehicle having vertical lifting and horizontal flight functions and provided with fixed wings. The one-man flight vehicle is composed of wings, a horizontal tail, a vertical tail, a main engine, a propeller, a safety harness, a flight controller, a machine body, a tail engine, a battery, a support arm, solar panels, a life-saving parachute and a life-saving air bag. Active transition between vertical lifting and horizontal flight is achieved through the tail engine, and remote flight is achieved through the wings with high aspect ratio. The wings, the horizontal tail, the vertical tail and the like can be stored in a foldable mode, the large-area solar panels are installed on the surfaces of a plurality of portions of the flight vehicle including the wings, and the whole flight vehicle becomes a huge solar charger after the wings are unfolded so that the problem of charging at any time at any place is solved. The wearing type one-man flight vehicle is simple in structure, the energy is green, a life-saving system is complete, and the application range is wide.

As can be observed, none of the prior art has anticipated or caused one skilled in the art of personal flight vehicles or devices to foresee this new invention by Bitar as obvious to a person skilled in the ordinary art of the industry. The Electric powered, personal JetPack provides an answer to the simple device that solves the above stated problems.

SUMMARY OF THE INVENTION

This invention is an Electric JetPack Device. Taught here are the ways a small, lightweight vertical take-off with the electrical power of rechargeable batteries may be a safe, vertical lift off vehicle. The system is capable of being carried by an average human, or mounted to landing skids, and is capable of flying for several minutes per charge, depending on the number of batteries and energy density of the batteries being carried. Power is connected to the batteries and managed through a 300-500-amp Electronic Speed Controller (ESC), which is managed by a flight controller. The Flight Controller balances thrust, and limits roll from side to side. The ESCs then drive the motors, which turn the cluster of small, multiple electric JetPack thrusters on a belt-like frame or turn an approximately 33.75-inch, 3 bladed propeller in a 34" inch, carbon-fiber duct. The control of the craft's direction is effectuated by moving handles connected to pivot points, mounted to an aluminum frame. The pivots tilt the ducts slightly forward or back. The frame is connected to a harness, in which the pilot is strapped. The craft is also modular and can be connected mechanically to another craft in the front or rear, creating a "quadcopter" setup, and the Flight Controller unit can be programmed to then fly the now 2-person craft, as a quadcopter. Additional modules can be added to carry more people, with the Flight Controller software modified accordingly. This design covers all such—oriented electric manned aircraft, with partial manual and partial electronic control. The system uses a belt-like cluster of small, multiple electric JetPack thrusters or uses ducted fans made of carbon fiber for light weight and strength but can also be fabricated from a variety of other materials. The frame is connected to aluminum rings slightly larger than the diameter of the duct, allowing the duct to be dropped into the ring and riveted in place. A "lip" or band around the propeller line is filled with Kevlar aramid fiber to prevent spall damage if the prop is somehow compromised.

The preferred embodiment of the Electric JetPack Device is a belt-like cluster Electric Jetpack Device comprised of: (a) a cluster of small, multiple electric JetPack thrusters, each thruster including (1) an external, lightweight support band; (2) a support structure including a motor support, an electric motor, at least one propeller, a means for removably securing the electric motor to the support structure, at least one rechargeable electric battery, a means for removably securing the electric battery to the support structure, a means for mechanically interconnecting the propeller and motor, and a means for electrically connecting the at least one rechargeable battery pack to the electric motor; and (3) a means for structurally interconnecting the support structure, the support band, and the fiber duct; (b) a pilot framework made of durable materials and including a lightweight support structure; a pair of handles pivotally secured to the lightweight support structure by a set of pivotal connectors/pivot points; a flight controller, used to manage a thrust from the propeller, the flight controller being mechanically secured to at least one of the handles and electrically connected to the ESC; and a harness, in which a pilot is strapped, connected to the lightweight support structure; and (c) the at least one rechargeable electric battery pack whereby the battery pack is electrically connected and managed/controlled by an Electronic Speed Controller (ESC), which is managed by the flight controller. The alternative embodiment replaces the belt-like cluster of small, multiple electric JetPack thrusters with at least one thruster duct including an external, lightweight carbon fiber duct.

The newly invented Electric JetPack Device can be manufactured at low volumes by very simple means and in high volume production by more complex and controlled systems.

OBJECTS AND ADVANTAGES

There are several objects and advantages of the Electric JetPack Device. There are currently no personal VTOL aircraft or s known that are effective at providing the objects of this invention. The Electric Jetpack Device:

| Item | Advantage |
| --- | --- |
| 1 | Is able to use device for Search and Rescue help |
| 2 | Is Rechargeable remotely (Vertipod option) |
| 3 | Can be modularized for more persons or cargo |
| 4 | Can use cluster motor and propellers |
| 5 | Has multiple electric ducted or clustered electric jets to create enough/sufficient controlled thrust with battery power alone |
| 6 | Has turbines that are electric powered not combustible fuels so there is virtually no dealing with heat, exhaust, and noise |
| 7 | The device is wearable by an individual and fully portable |
| 8 | Has ducts that assist in thrust and protect pilot from open blade hazards - so provides safe wear-ability as compared to many other current Electric Vertical Take Off and Landing (EVTOL) personal crafts |
| 9 | Can have safe, Kevlar shroud for ducts |
| 10 | Has good percentage thrust over load to permit better control |

-continued

| Item | Advantage |
| --- | --- |
| 11 | Permits the operator to easily transport and propel himself and a payload at low altitudes across various terrains |

Finally, other advantages and additional features of the present Electric Jetpack Device will be more apparent from the accompanying drawings and from the full description of the device. For one skilled in the art of VTOL aircraft, s, and electrical propulsion systems for vehicles, it is readily understood that the features shown in the examples with this product are readily adapted to other types of electrically propelled aircraft and similar systems and devices.

DESCRIPTION OF THE DRAWINGS—FIGURES

The accompanying drawings, which are incorporated in and constitute a part of this specification, illustrate an embodiment of the Electric Jetpack Device. The drawings together with the summary description given above and a detailed description given below serve to explain the principles of the Electric Jetpack Device. It is understood, however, that the device is not limited to only the precise arrangements and instrumentalities shown.

FIGS. 1 A through 1 D are sketches of the general Electric Jetpack device, a solid model, a prototype, and a belt-like cluster of small, multiple electric JetPack thrusters.

FIGS. 2 A and 2 B are isometric view sketches of the solid model of the general Electric Jetpack device with components and features noted.

FIGS. 3 A through 3 C are front view sketches of a prototype of the general Electric Jetpack device with the components and features shown both on and off the operator and showing it summonsed to the operator.

FIG. 5 is a sketch of the lightweight framework for the general Electric Jetpack device with the components and features indicated.

FIGS. 6 A through 6 C are general sketches of a general Electric Jetpack device with the lightweight framework and handles shown plus the framework connected to the thruster duct and the thruster duct in a Vertipod charging position.

FIGS. 7 A through 7 D are front, side, isometric and top views of the general Electric Jetpack device with components and features noted.

FIGS. 8 A through 8 E are views of a prototype of the general Electric Jetpack device with general features and components noted.

Figure 9:
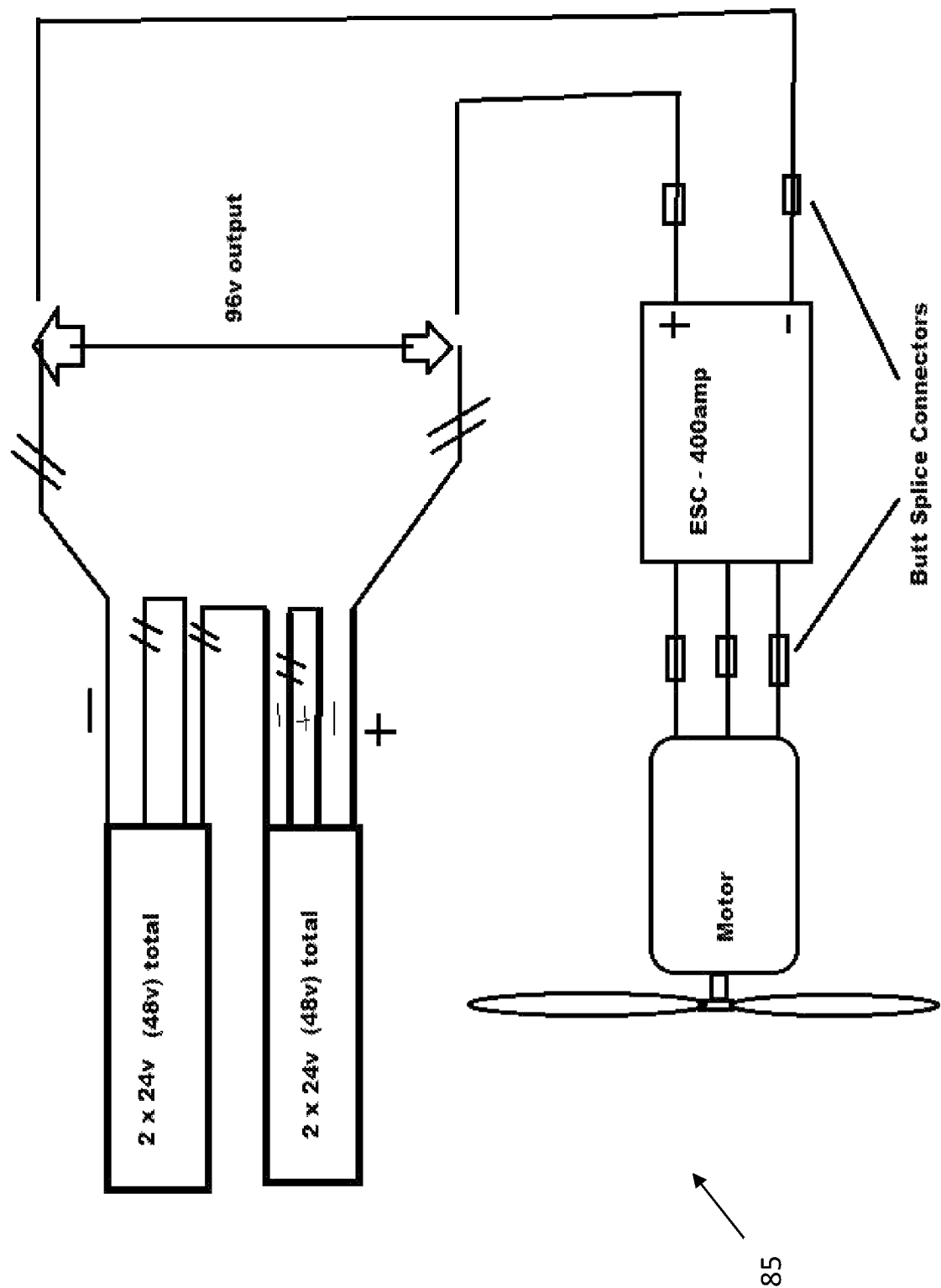

FIG. 9 is a basic electrical schematic for the general Electric Jetpack device.

Figure 10:
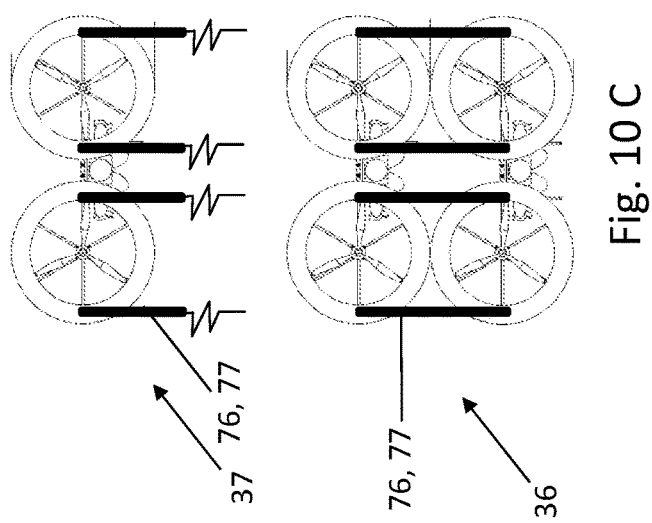
Figure 10:
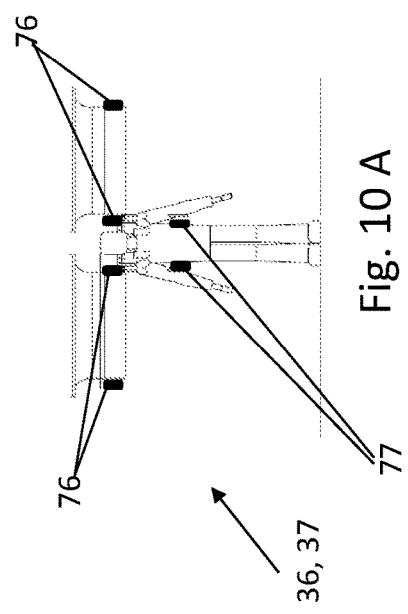

FIGS. 10 A through 10 C are sketches of the general Electric Jetpack device configured as modules to increase the capability for additional persons or payload to be transported.

Figure 11:
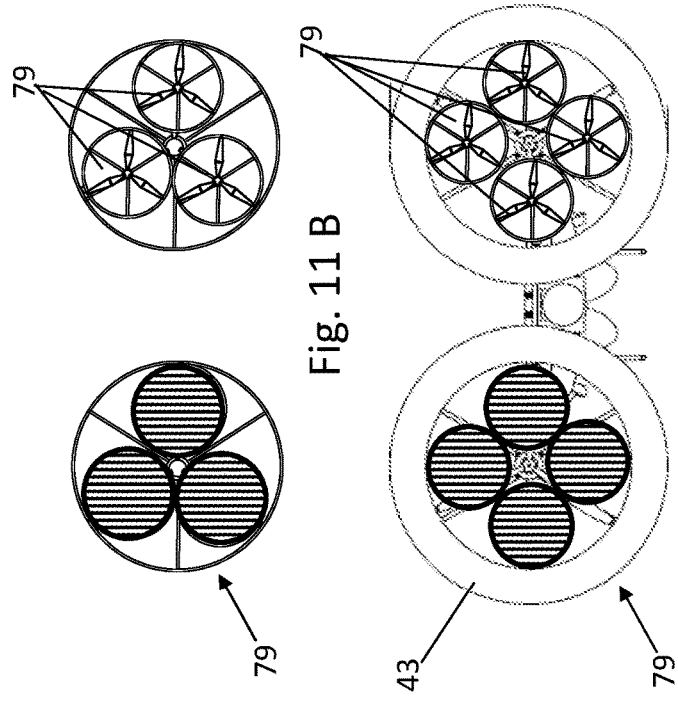
Figure 11:
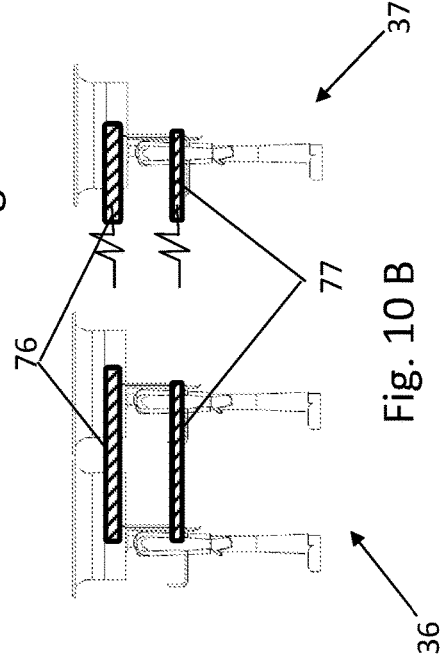

FIGS. 11 A and 11 B are alternative thruster ducts with small clusters of motors and propellers and the components noted.

FIGS. 12 A through 12 D are views of a general Electric Jetpack device being operated by moving the thruster ducts with the handles for guidance.

FIGS. 13 A through 13 E are build sketches of a general Electric Jetpack device with the components and features shown and with the operator/pilot.

Figure 14:
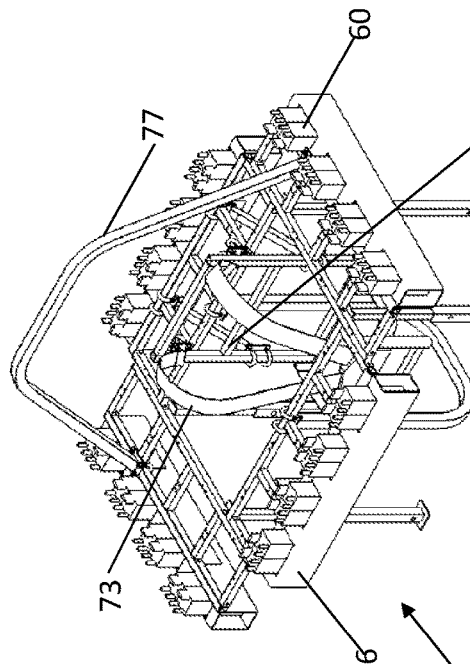
Figure 14:
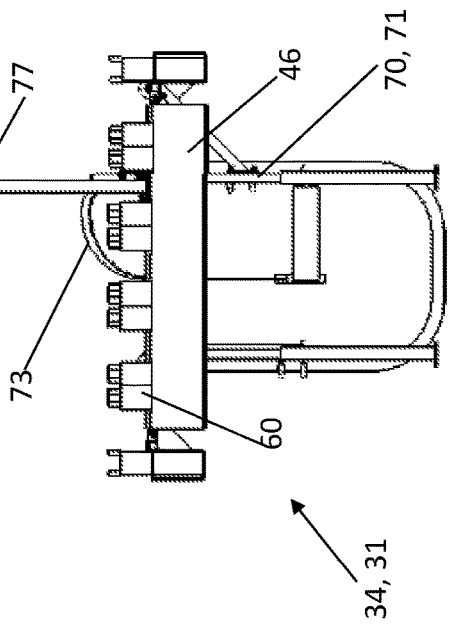
Figure 14:
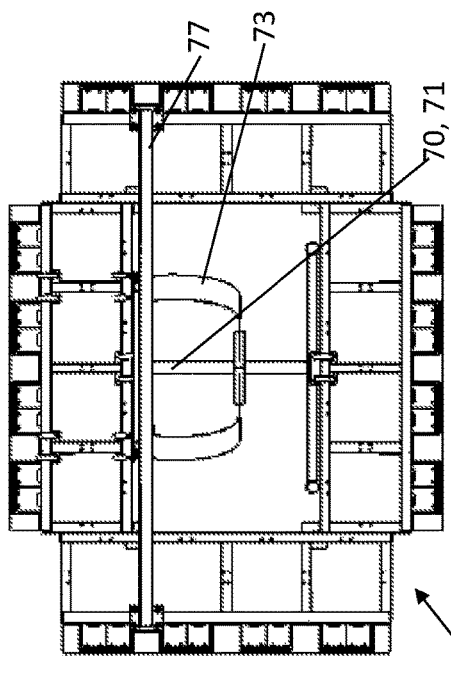
Figure 14:
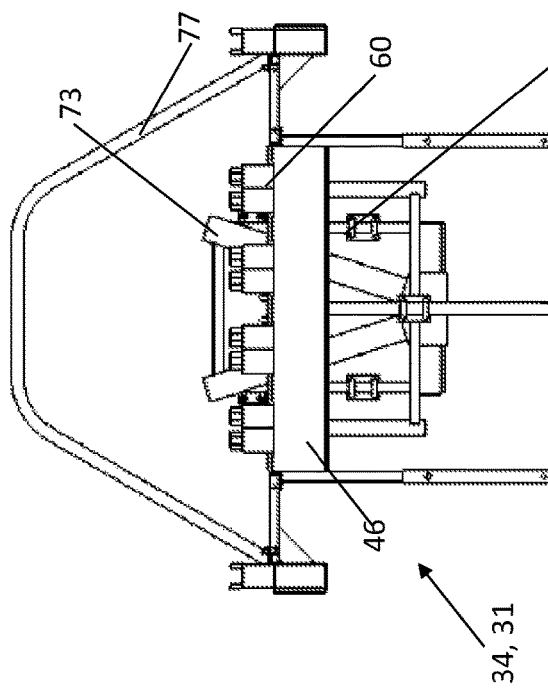

FIG. 14 A through 14 D are build sketches of a general Electric Jetpack device with the components and features shown and without the operator/pilot.

DESCRIPTION OF THE DRAWINGS—REFERENCE NUMERALS

The following list refers to the drawings:

TABLE B

Reference numbers

| Ref # | Description |
|---|---|
| 31 | Electric Jetpack device 31 |
| 32 | design drawing 32 of the ducted Electric Jetpack device 31 |
| 33 | solid drawing 33 of the Electric Jetpack device 31 |
| 34 | design drawing 34 of the multi-electric and wearable Jetpack device 31 in an all lightweight metal structure |
| 35 | prototype 35 of the Electric Jetpack device 31 |
| 36 | modules quad-copter 36 of the Electric Jetpack device 31 |
| 37 | single copter pod 37 of the Electric Jetpack device 31 |
| 40 | thruster duct 40 with intake 41, the carbon filled fiber duct 43 with optional Kevlar fibers, the motor mount structure 42 and support band 46 all which houses the electric motors 50, propeller blades 55 and the mechanical means 47 for connecting the motor 50 to the structure 42, the mechanical means 48 for connecting the propeller blades 55 to the motor 50, the electrical means 49 to connect the motor 50 to the rechargeable battery pack 60, and the mechanical/structural means 46A for connecting the support band 46 to the motor mount structure 42 |
| 41 | intake 41 |
| 42 | motor mount structure 42 |
| 43 | the carbon filled fiber duct 43 with optional Kevlar fibers |
| 45 | exhaust thrust 45 |
| 46 | support band 46 aka fan ring |
| 46A | the mechanical/structural means 46A for connecting the support band 46 to the motor mount structure 42 |
| 47 | mechanical means 47 for connecting the motor 50 to the structure 42 |
| 48 | the mechanical means 48 for connecting the propeller blades 55 to the motor 50 |
| 49 | the electrical means 49 to connect the motor 50 to the rechargeable battery pack 60 |
| 50 | electric motors 50 |
| 51 | means 51 to connect the rechargeable battery pack 60 to the lightweight support frame 64 |
| 55 | propeller assembly 55 |
| 60 | rechargeable battery pack 60 |
| 63 | pilot support structure 63 |
| 64 | lightweight support frame 64 |
| 65 | guidance handles 65 |
| 66 | flight controller 66 |
| 67 | means 67 for electrically connecting flight controller 66 to the Electronic Speed Controller (ESC) 69 |
| 68 | means 68 for electrically connecting Electronic Speed Controller (ESC) 69 to the rechargeable battery pack 60 |
| 69 | Electronic Speed Controller (ESC) 69, which is managed by the flight controller 66 |
| 70 | harness 70 |
| 71 | means 71 for removably connecting harness 70 to lightweight support frame 64 |
| 72 | means 72 for connecting pivot tubes 74 and handles 65 to thruster duct 40 |
| 73 | back shoulder rest 73 |
| 74 | pivot tubes 74 |

TABLE B-continued

Reference numbers

| Ref # | Description |
|---|---|
| 75 | optional landing skid 75 |
| 76 | structure 76 at the support band 46 to connect one Electric Jetpack device 31 to a second or third, etc. Electric Jetpack device 31 |
| 77 | structure 77 at the lightweight support frame 64 to connect one Electric Jetpack device 31 to a second or third, etc. Electric Jetpack device 31 |
| 78 | means 78 to electrically control a second or third Electronic Speed Controller (ESC) 69 on a second or third device 31 and leave a first Electronic Speed Controller (ESC) 69 of a first device 31 as master controller of the motors and thrust |
| 79 | small cluster 79 of more than one motor and propellers configured within a support band 46 as a replacement to the single motor 50 and propeller 55 of the preferred device 31 |
| 80 | Vertipod-like control system 80 and motor/generators to enable a recharging of the device 31 |
| 85 | electrical schematic 85 for device 31 |
| 90 | frame structure 90 (various cross sections - tubes, angle/I C etc. and various materials - steel, steel alloys, titanium, aluminum; composite metals, etc. |
| 100 | pilot, operator, user 100 |

Detailed Description of Preferred Embodiment

The present device is an Electric Jetpack Device. It relates to powered aircraft. A one-person-carrying electric, using side-by-side " " thrusters, vertical-takeoff-and-landing (VTOL), aircraft for individual transportation. More particularly, the device relates to relatively small, lighter weight powered aircraft capable of vertical take-offs and propulsion across various terrain at low altitudes. This invention relates to a propulsion device which is capable to lifting and/or propelling a person or an aircraft, such as a helicopter or an airplane, through the air. The uniqueness of the device is its capability of using electrical power from batteries to propel a person into flight with vertical take-off. This design covers all such oriented electric manned aircraft, with partial manual and partial electronic control. The device has several optional features which are explained within this application. For example, but not as a limitation, the system uses ducted fans made of carbon fiber for light weight and strength but can also be fabricated from a variety of other materials. The system is capable of being carried by an average human, or mounted to landing skids, and is capable of flying for several minutes per charge, depending on the number of batteries and energy density of the batteries being carried.

The advantages for the Electric Jetpack Device 31 are listed above in the introduction. Succinctly the benefits are that the Personal Electric Helicopter device:

A. Is able to use device for Search and Rescue help
B. Is Rechargeable remotely (Vertipod option)
C. Can be modularized for more persons or cargo
D. Can use cluster motor and propellers
E. Has multiple electric ducted or clustered electric jets to create enough/sufficient controlled thrust with battery power alone
F. Has turbines that are electric powered not combustible fuels so there is virtually no dealing with heat, exhaust, and noise G. The device is wearable by an individual and fully portable
H. Has ducts that assist in thrust and protect pilot from open blade hazards—so provides safe wearability as compared to many other current Electric Vertical Take Off and Landing (EVTOL) personal crafts
I. Can have safe, Kevlar shroud for ducts
J. Has good percentage thrust over load to permit better control
K. Permits the operator to easily transport and propel himself and a payload at low altitudes across various terrains The preferred embodiment of the Electric JetPack Device is a belt-like cluster Electric Jetpack Device comprised of: (a) a cluster of small, multiple electric JetPack thrusters, each thruster including (1) an external, lightweight support band; (2) a support structure including a motor support, an electric motor, at least one propeller, a means for removably securing the electric motor to the support structure, at least one rechargeable electric battery, a means for removably securing the electric battery to the support structure, a means for mechanically interconnecting the propeller and motor, and a means for electrically connecting the at least one rechargeable battery pack to the electric motor; and (3) a means for structurally interconnecting the support structure, the support band, and the fiber duct; (b) a pilot framework made of durable materials and including a lightweight support structure; a pair of handles pivotally secured to the lightweight support structure by a set of pivotal connectors/pivot points; a flight controller, used to manage a thrust from the propeller, the flight controller being mechanically secured to at least one of the handles and electrically connected to the ESC; and a harness, in which a pilot is strapped, connected to the lightweight support structure; and (c) the at least one rechargeable electric battery pack whereby the battery pack is electrically connected and managed/controlled by an Electronic Speed Controller (ESC), which is managed by the flight controller. The alternative embodiment replaces the belt-like cluster of small, multiple electric JetPack thrusters with at least one thruster duct including an external, lightweight carbon fiber duct.

There is shown in FIGS. 1-12 a complete description and operative embodiment of the Electric Jetpack Device. In the drawings and illustrations, one notes well that the FIGS. 1-12 demonstrate the general configuration and use of this product. The various example uses are in the operation and use section, below.

The accompanying drawings, which are incorporated in and constitute a part of this specification, illustrate an embodiment of the Electric Jetpack Device 31 that is preferred. The drawings together with the summary description given above and a detailed description given below serve to explain the principles of the device 31. It is understood, however, that the Electric Jetpack Device 31 is not limited to only the precise arrangements and instrumentalities shown. Other examples of vertical takeoff aircraft and devices and uses are still understood by one skilled in the art of electrical vehicles, VTOL aircraft and such to be within the scope and spirit shown here.

The Electric Jetpack Device shows and demonstrates a way a small, lightweight vertical take-off with the electrical power of rechargeable batteries may be a safe, vertical lift off vehicle. The device is capable of being carried by an average human, or mounted to landing skids, and is capable of flying for several minutes per charge, depending on the number of batteries and energy density of the batteries being carried. Motors are connected and powered by the batteries and managed through a 300-500-amp Electronic Speed Controller (ESC), which is managed by a flight controller. The Flight Controller balances thrust, and limits roll from side to side. The ESCs then drive the motors, which turn an approximately 33.75-inch, 3 bladed propeller in a 34" inch, carbon-fiber duct. By moving the handles connected to pivot points and mounted to an aluminum frame, the craft is controlled and directed. The pivots tilt the ducts slightly forward or back. The frame is connected to a harness, in which the pilot is strapped. The craft is also modular and can be connected mechanically to another craft in the front or rear, creating a "quadcopter" setup, and the Flight Controller unit can be programmed to then fly the now 2-person craft, as a quadcopter. Additional modules can be added to carry more people, with the Flight Controller software modified accordingly. This design covers all such oriented electric manned aircraft, with partial manual and partial electronic control. The system uses ducted fans made of carbon fiber for light weight and strength but can also be fabricated from a variety of other materials. The frame is connected to aluminum rings slightly larger than the diameter of the duct, allowing the duct to be dropped into the ring and riveted in place. A "lip" or band around the propeller line is filled with Kevlar aramid fiber to prevent spall damage if the prop is somehow compromised.

FIG. 1A through 1D are design sketches 32 of the general Electric Jetpack device 31, a solid model 33, prototype 35, and a belt-like cluster of small, multiple electric JetPack thrusters. Here are demonstrated an Electric Jetpack device 31; a design drawing 32 of the ducted Electric Jetpack device 31; a solid drawing 33 of the Electric Jetpack device 31; a prototype 35 of the Electric Jetpack device 31; and a design drawing 34 of the multi-electric and wearable Jetpack device 31 in an all lightweight metal structure.

FIGS. 2A and 2B are isometric view sketches of the solid model 33 of the general Electric Jetpack device 31 with components and features noted. These sketches show: a solid drawing 33 of the Electric Jetpack device 31; a thruster duct 40 with intake 41, the carbon filled fiber duct 43 with optional Kevlar fibers, the motor mount structure 42 and support band 46 all which houses the electric motors 50, propeller blades 55 and the mechanical means 47 for connecting the motor 50 to the structure 42, the mechanical means 48 for connecting the propeller blades 55 to the motor 50, the electrical means 49 to connect the motor 50 to the rechargeable battery pack 60, and the mechanical/structural means 46A for connecting the support band 46 to the motor mount structure 42 such as welding, brazing, threaded fasteners, apertures/clips/ and cotter pins, epoxy, etc.; a motor mount structure 42; the carbon filled fiber duct 43 with optional Kevlar fibers or equal; a support band 46 aka fan ring; a mechanical means 47 for connecting the motor 50 to the structure 42; a mechanical means 48 for connecting the propeller blades 55 to the motor 50; an electrical means 49 to connect the motor 50 to the rechargeable battery pack 60; electric motors 50; a propeller assembly 55; a rechargeable battery pack 60; a pilot 100 support structure 63; a lightweight support frame 64; a pair of guidance handles 65; a flight controller 66; an Electronic Speed Controller (ESC) 69, which is managed by the flight controller 66; a back shoulder rest 73; and a pilot 100.

Figure 1B:
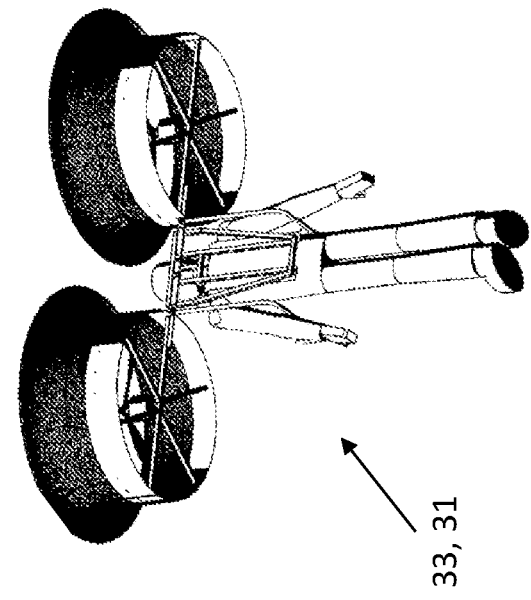
Figure 1D:
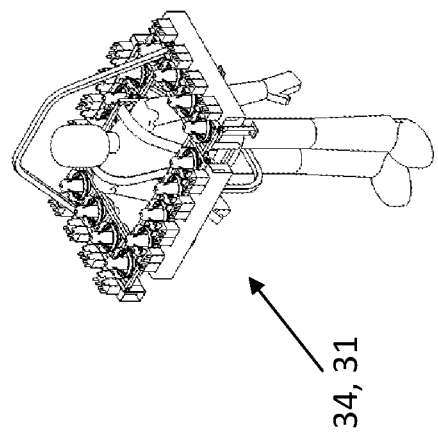
Figure 1A:
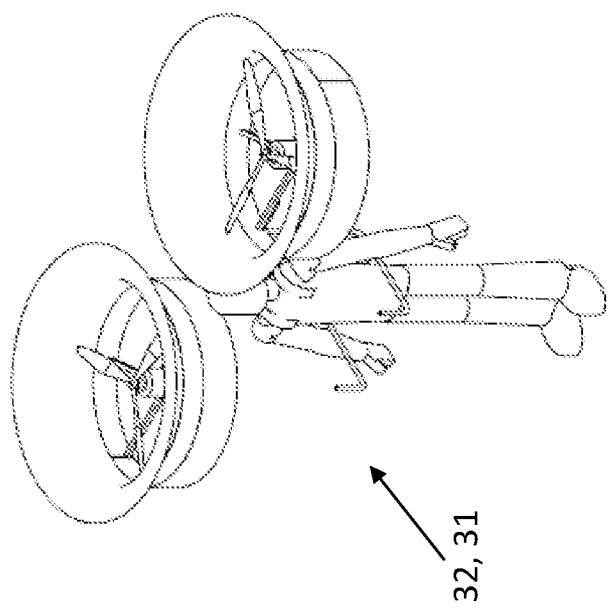
Figure 1C:
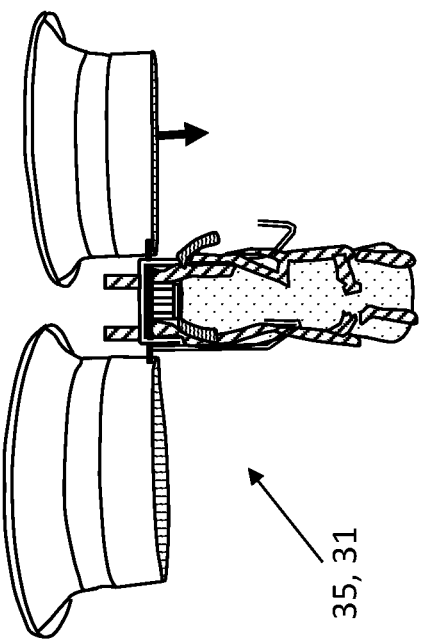
Figure 2:
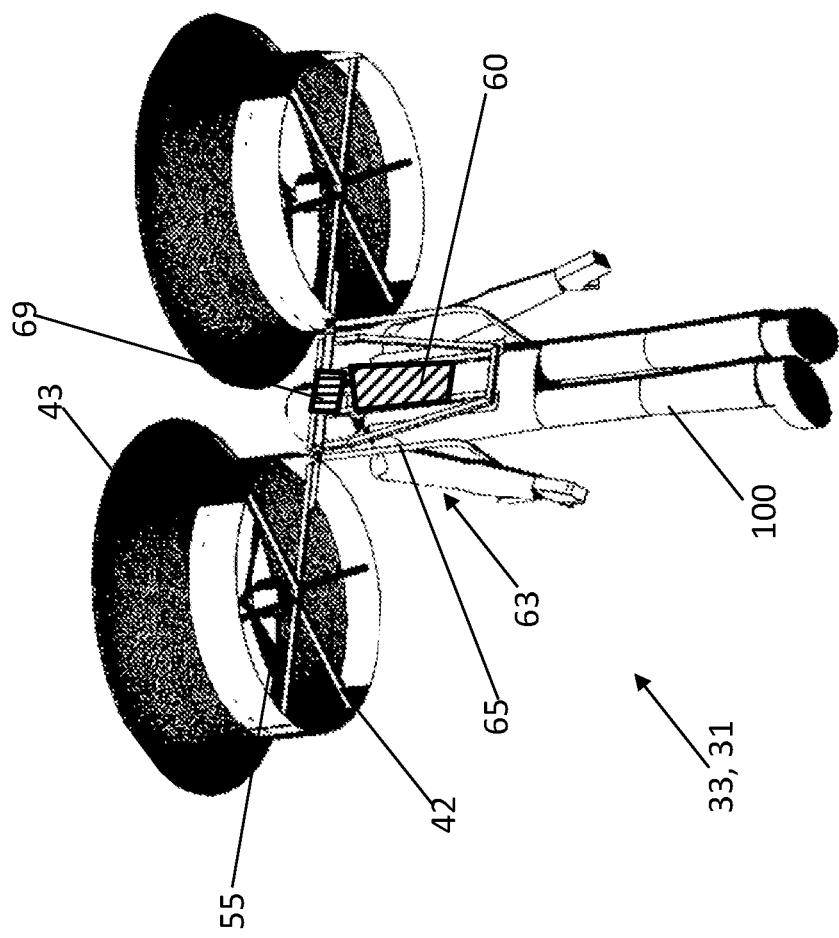
Figure 2:
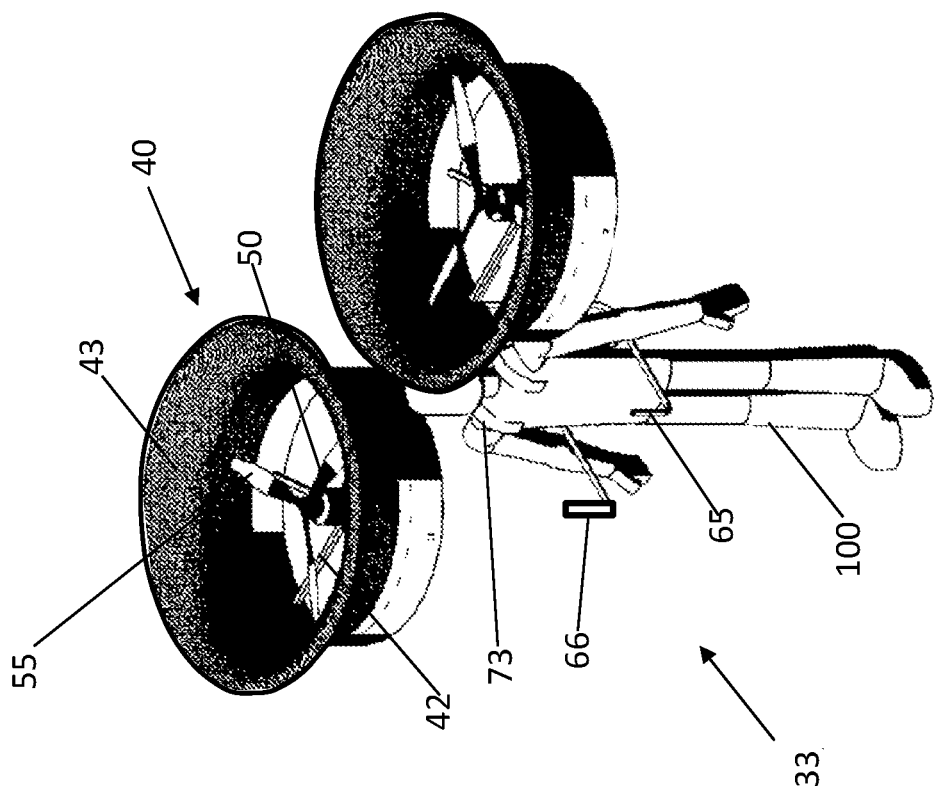
Figure 3:
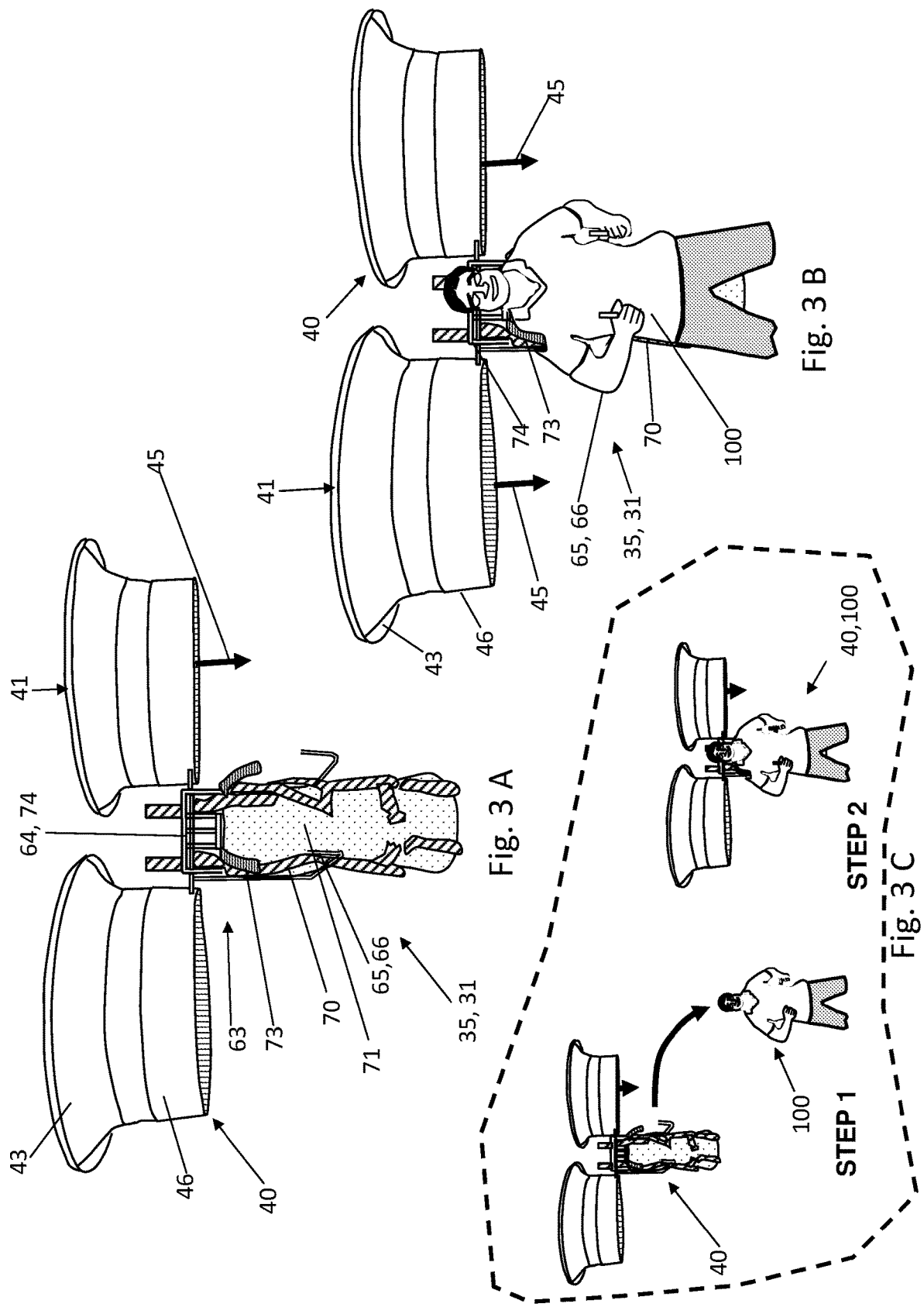

FIGS. 3A through 3C are front view sketches of a prototype 35 of the general Electric Jetpack device 31 with the components and features shown both on and off the operator, pilot 100 and showing it summonsed to the operator, pilot 100. Provided in these views are: an Electric Jetpack device 31; a prototype 35 of the Electric Jetpack device 31; a thruster duct 40 with intake 41, the carbon filled fiber duct 43 with optional Kevlar fibers, the motor mount structure 42 and support band 46 all which houses the electric motors 50, propeller blades 55 and the mechanical means 47 for connecting the motor 50 to the structure 42, the mechanical means 48 for connecting the propeller blades 55 to the motor 50, the electrical means 49 to connect the motor 50 to the rechargeable battery pack 60, and the mechanical/structural means 46A for connecting the support band 46 to the motor mount structure 42; an intake 41; the carbon filled fiber duct 43 with optional Kevlar fibers; an exhaust thrust 45; a support band 46 aka fan ring; a pilot 100 support structure 63 a lightweight support frame 64; a pair of guidance handles 65; a harness 70; a means 71 for removably connecting harness 70 to lightweight support frame 64; a back shoulder rest 73; a set of pivot tubes 74; and a pilot 100. In FIG. 3 C, Step 1 the prototype 35 of the general Electric Jetpack device 31 is separate from the pilot 100 and "waiting on stand-by" to be called or summonsed by the pilot 100. The pilot communicates electronically to the device 35 and the device 31, 35 starts up and automatically is controlled by the controller 66 and Electronic Speed Controller (ESC) 69, which is managed by the flight controller 66, and moves toward the pilot 100. In Step 2, the pilot 100 engages and straps on the harness 70 to take full control of the device 31, 35.

Figure 4:
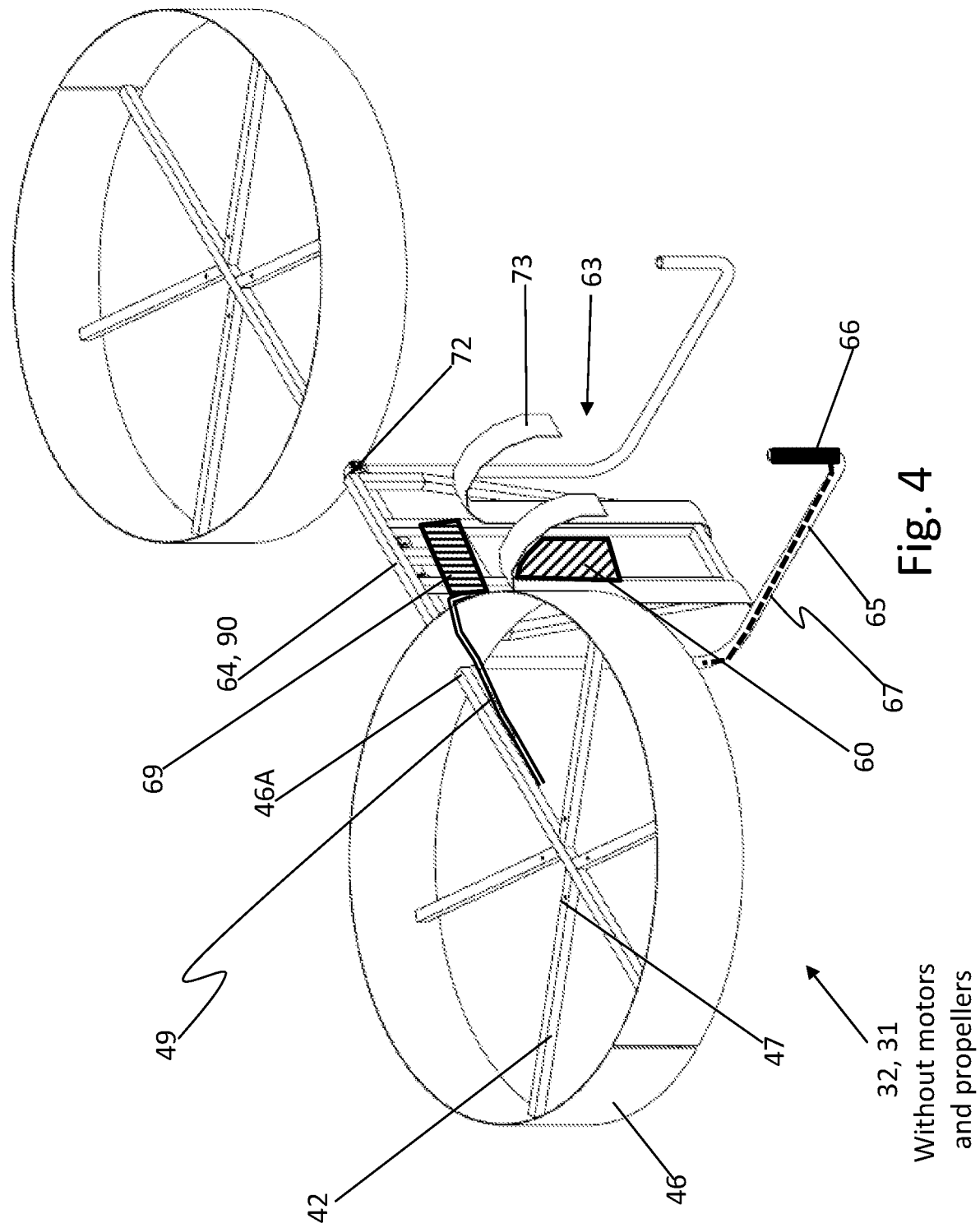
FIG. 4 is an isometric sketch of the general Electric Jetpack device having components and features shown.

FIG. 4 is an isometric sketch 32 of the general ducted Electric Jetpack device 31 having components and features shown. In this sketch, the components shown include: an Electric Jetpack device 31; a design drawing 32 of the ducted Electric Jetpack device 31; a motor mount structure 42; a support band 46 aka fan ring; a mechanical/structural means 46A for connecting the support band 46 to the motor mount structure 42; a mechanical means 47 for connecting the motor 50 to the structure 42; an electrical means 49 to connect the motor 50 to the rechargeable battery pack 60; a rechargeable battery pack 60; a pilot 100 support structure 63 a lightweight support frame 64; a pair of guidance handles 65; a flight controller 66; a means 67 for electrically connecting flight controller 66 to the Electronic Speed Controller (ESC) 69; a means 68 for electrically connecting Electronic Speed; a Controller (ESC) 69 to the rechargeable battery pack 60; an Electronic Speed Controller (ESC) 69, which is managed by the flight controller 66; a means 72 for connecting pivot tubes 74 and handles 65 to thruster duct 40; a back shoulder rest 73; a set of pivot tubes 74; and frame structure 90 (various cross sections—tubes, angle/I C etc. and various materials—steel, steel alloys, titanium, aluminum, composite metals, etc.

FIG. 5 is a sketch of the lightweight framework 64, 90 for the general Electric Jetpack device with the components and features indicated. This view shows and demonstrates: component parts for the Electric Jetpack device 31; a design drawing 32 of the components for the ducted Electric Jetpack device 31; an electrical means 49 to connect the motor 50 to the rechargeable battery pack 60; a means 51 to connect the rechargeable battery pack 60 to the a lightweight support frame 64; a means 67 for electrically connecting flight controller 66 to the Electronic Speed Controller (ESC) 69; a means 66 for electrically connecting Electronic Speed; a Controller (ESC) 69 to the rechargeable battery pack 60; an Electronic Speed Controller (ESC) 69, which is managed by the flight controller 66; a means 72 for connecting pivot tubes 74 and handles 65 to thruster duct 40; a back shoulder rest 73; and a set of pivot tubes 74.

FIG. 6 A through 6 C are more general sketches of a general Electric Jetpack device 31 with the lightweight framework 63 and handles 65 shown plus the framework 64 connected to the thruster duct 40 and the thruster duct 40 in a Vertipod 80 charging position. In these views, components that can be seen include: an Electric Jetpack device 31; a design drawing 32 of components for the ducted Electric Jetpack device 31; a thruster duct 40 with intake 41, the carbon filled fiber duct 43 with optional Kevlar fibers, the motor mount structure 42 and support band 46 all which houses the electric motors 50, propeller blades 55 and the mechanical means 47 for connecting the motor 50 to the structure 42, the mechanical means 48 for connecting the propeller blades 55 to the motor 50, the electrical means 49 to connect the motor 50 to the rechargeable battery pack 60, and the mechanical/structural means 46A for connecting the support band 46 to the motor mount structure 42; a mechanical/structural means 46A for connecting the support band 46 to the motor mount structure 42; a pilot 100 support structure 63 a lightweight support frame 64; a means 72 for connecting pivot tubes 74 and handles 65 to thruster duct 40; a back shoulder rest 73; a set of pivot tubes 74; and a Vertipod-like control system 80 and motor/generators to enable a recharging of the device 31.

FIGS. 7 A through 7 D are front, side, isometric and top design views 32 of the general ducted Electric Jetpack device 31 with components and features noted. Portrayed components are: an Electric Jetpack device 31; a design drawing 32 of the ducted Electric Jetpack device 31; a thruster duct 40 with intake 41, the carbon filled fiber duct 43 with optional Kevlar fibers, the motor mount structure 42 and support band 46 all which houses the electric motors 50, propeller blades 55 and the mechanical means 47 for connecting the motor 50 to the structure 42, the mechanical means 48 for connecting the propeller blades 55 to the motor 50, the electrical means 49 to connect the motor 50 to the rechargeable battery pack 60, and the mechanical/structural means 46A for connecting the support band 46 to the motor mount structure 42; a motor mount structure 42; the carbon filled fiber duct 43 with optional Kevlar fibers or equal; a support band 46 aka fan ring; a mechanical means 48 for connecting the propeller blades 55 to the motor 50; a lightweight support frame 64; a pair of guidance handles 65; a back shoulder rest 73; and a pilot 100.

FIG. 8 A through 8 E are views of a prototype 35 of the general Electric Jetpack device 31 with general features and components noted. These views demonstrate and provide: an Electric Jetpack device 31; a prototype 35 of the Electric Jetpack device 31; a thruster duct 40 with intake 41, the carbon filled fiber duct 43 with optional Kevlar fibers, the motor mount structure 42 and support band 46 all which houses the electric motors 50, propeller blades 55 and the mechanical means 47 for connecting the motor 50 to the structure 42, the mechanical means 48 for connecting the propeller blades 55 to the motor 50, the electrical means 49 to connect the motor 50 to the rechargeable battery pack 60, and the mechanical/structural means 46A for connecting the support band 46 to the motor mount structure 42; a motor mount structure 42; the carbon filled fiber duct 43 with optional Kevlar fibers; a support band 46 aka fan ring; a mechanical/structural means 46A for connecting the support band 46 to the motor mount structure 42; a rechargeable battery pack 60; a lightweight support frame 64; a pair of guidance handles 65; an Electronic Speed Controller (ESC) 69, which is managed by the flight controller 66; a harness 70; a means 71 for removably connecting harness 70 to lightweight support frame 64; a means 72 for connecting pivot tubes 74 and handles 65 to thruster duct 40; a back shoulder rest 73; a set of pivot tubes 74; and an optional landing skid 75.

FIG. 9 is a basic electrical schematic for the general Electric Jetpack device 31. Here is shown the electrical schematic 65 for device 31. It is fairly self-explanatory for one skilled in the art of electrical power from batteries to electric motors. The prototype system is capable of being carried by an average human, or mounted to landing skids, and is capable of flying for several minutes per charge, depending on the number of batteries and energy density of the batteries being carried. The current embodiment uses either 4 or 8, 48-volt batteries, powering two 90-100 volt motors, one in each duct. Power is connected to the batteries and managed through a 300-500-amp Electronic Speed Controller (ESC), which is managed by a flight controller. The Flight Controller balances thrust, and limits roll from side to side. The ESCs then drive the motors, which turn a 33.75-inch, 3 bladed propeller in a 34" inch, carbon-fiber duct. This system anticipates various types of rechargeable battery back including but not limited to Nickle Cadmium batteries, Nickle Metal Hydride batteries, Lithium-Ion batteries, Small and sealed lead acid batteries. These may be Absorbed glass mat (AGM) battery or gel battery ("gel cell"). Other experimental types include Lithium sulfur, Sodium-ion, Thin film lithium, Zinc-bromide, Zinc-cerium, Vanadium redox, Sodium-sulfur, Molten salt, and Silver-zinc. One skilled in the art of rechargeable batteries also anticipates and fully expects other battery types to be developed which will function well and be within the scope and breadth of this new invention.

FIGS. 10 A through 10 C are sketches of the general Electric Jetpack device configured as modules to increase the capability for additional persons or payload to be transported. Shown in these views are an Electric Jetpack device 31 configured as—modules quad-copter 36 of the Electric Jetpack device 31 and a single copter pod 37 of the Electric Jetpack device 31. The units still have the thruster duct 40 with an intake 41, the carbon filled fiber duct 43 with optional Kevlar fibers, the motor mount structure 42 and support band 46 all which houses the electric motors 50, propeller blades 55 and the mechanical means 47 for connecting the motor 50 to the structure 42, the mechanical means 48 for connecting the propeller blades 55 to the motor 50, the electrical means 49 to connect the motor 50 to the rechargeable battery pack 60, and the mechanical/structural means 46A for connecting the support band 46 to the motor mount structure 42. However, they are then grouped by structural means—a structure 76 at the support band 46 to connect one Electric Jetpack device 31 to a second or third, etc. Electric Jetpack device 31. And then, a structure 77 at the lightweight support frame 64 to connect one Electric Jetpack device 31 to a second or third, etc. Electric Jetpack device 31. Finally, the electrical system is equipped with a means 78 to electrically control a second or third Electronic Speed Controller (ESC) 69 on a second or third device 31 and leave a first Electronic Speed Controller (ESC) 69 of a first device 31 as the master controller (no shown) of the motors and thrust.

FIGS. 11 A and 11 B are alternative thruster ducts 40 with small clusters 79 of motors 50 and propellers 55. Here the Electric Jetpack device 31 is now shown comprised with a small cluster 79 of more than one motor and propellers configured within a support band 46 as a replacement to the single motor 50 and propeller 55 of the preferred device 31.

The general Electric Jetpack Device and components were identified above. These frame structures 64, 90 may be of a variety of configurations. For example, and not as a limitation, the structures may be tubular (round, oval, square, rectangular or other regular or non-regular polygonal cross-sections); the structures may be angles, Zees, Tees, "I" or wide flange ("W" or "H") or other cross-sections not specifically identified. The materials for example and not limitation may be a metal like steel, a steel alloy, aluminum, titanium, a composite plastic or any other light weight, durable material. The propellers may be a metal such as steel, steel alloy, aluminum, titanium; a composite material; a wood laminate, or other durable, light weight yet sufficiently strong material. Propellers are well known in the art of aircraft and may be selected from a plethora of styles and materials. The other components such as the harnesses, connection components, skids and the like are likewise expected to be of lightweight, strong and durable materials shaped to appropriate configurations. However, these are exemplary and lot limitations to other means which are well within the spirit and scope of the full embodiment of the device 31. The entire propeller driven system, as just described rotates around the fixed shaft which can have an aperture (hollow opening) throughout its center. The various control wiring is often guided along and through the structure as is well known in the art of lightweight aircraft. Also, a mount for the motor(s) 50 and battery (ies) 60 are normally retained by a collar to the shaft. Thereby the battery (ies) is connected through cables (not shown) to the motor(s). The electric power from the battery powers the motor which transforms the stored electrical energy into kinetic energy and rotational power. This power is further transferred to the propellers and the system shown or a functional equivalent. The motors 50/battery system 60 may have relatively simple controls as one skilled in the art of electromechanical power systems well appreciates. An optional remote-control system may be employed for using the device 31 as a drone, non-human pilot-controlled aircraft if desired. This remote system is also well known to those skilled in the art of electrical and electronic remote-control systems.

FIG. 6 C is a sketch of the general uplift means serviced with an alternative motor generator system for the general Electric Jetpack device 31 with general features and components noted. Here the system shows a motor generator option with converter controls. The motor generator or an equivalent motor variation permits the drive system to be reversed. The propellers then become a drive and take kinetic energy from the ambient wind, transfer it to rotational motion of the propellers which in turn drive the system to turn the motor or motor generator and generate electricity to charge the battery (ies). Anticipated in the electromechanical drive and charging system are some variation of a control/conversion system with Silicon Controlled Rectifiers (SCRs) or Field Effect Transistors (FETs). This type of control is well known to those skilled in the art of electrical and electronic control systems for electromechanical devices. This configuration is somewhat similar to that in the Vertipod patent (reference the "VertiPod" U.S. Pat. No. 9,440,736 issued to Pete Bitar, Sep. 13, 2016).

FIGS. 12 A through 12 D are views of a general Electric Jetpack device being operated by moving the thruster ducts 40-A and 40-B with the handles for guidance. This is described in the operation section.

FIGS. 13 A through 13 E are build sketches of a general electric clustered Electric Jetpack Device design drawings 34, 31 with the components and features shown and with the operator/pilot 100. Here are shown a Front view—FIG. 13 A, a Side view—FIG. 13 B, a Top view—FIG. 13 C, a Front Isometric view—FIG. 13 D, and a Back Isometric view—

FIG. 13 D. Components and features demonstrated and shown are: a special Electric JetPack device 31; a design drawing 34 of the multi-electric and wearable Jetpack device 31 in an all lightweight metal structure; the motor mount structure 42 and support band 46 all which houses the electric motors 50, propeller blades 55 and the mechanical means 47 for connecting the motor 50 to the structure 42, the mechanical means 48 for connecting the propeller blades 55 to the motor 50, the electrical means 49 to connect the motor 50 to the rechargeable battery pack 60, and the mechanical/structural means 46A for connecting the support band 46 to the motor mount structure 42; a motor mount structure 42; a support band 46 aka fan ring; electric motors 50; a means 51 to connect the rechargeable battery pack 60 to the a lightweight support frame 64; a propeller assembly 55 a rechargeable battery pack 60; a pilot 100 support structure 63 a lightweight support frame 64; a harness 70; a means 71 for removably connecting harness 70 to lightweight support frame 64; a back shoulder rest 73; an optional landing skid 75; a structure 76 at the support band 46 to connect one Special Electric JetPack device 31 to a second or third, etc. and a pilot 100. Other components present are similar to those depicted in the other sketches within this specification and are included by reference. Note well the JetPack has multiple electric ducted or clustered electric jets to create enough/sufficient controlled thrust with battery power alone. In addition, the device with its turbines is electric powered and not powered by combustible fuels so there is virtually no dealing with heat, exhaust, and noise with these clustered small electric JetPacks. Further, the device is wearable by an individual and fully portable. It has ducts that assist in thrust and protect pilot from open blade hazards—so provides safe wearability as compared to many other current Electric Vertical Take Off and Landing (EVTOL) personal crafts.

FIGS. 14 A through 13 D are build sketches of a general Electric Jetpack device with the components and features shown and without the operator/pilot 100. Also, these sketches do not show the motor and turbines, only the space for them and the battery packs. Here are shown a Top view—FIG. 14 A, a Front view—FIG. 14 B, a Side view—FIG. 14 C, and a Front Isometric view—FIG. 14 D. Components and features demonstrated and shown are: a special Electric JetPack device 31; a design drawing 34 of the multi-electric and wearable Jetpack device 31 in an all lightweight metal structure; the motor mount structure 42 and support band 46 all which houses the electric motors 50, propeller blades 55 and the mechanical means 47 for connecting the motor 50 to the structure 42, the mechanical means 48 for connecting the propeller blades 55 to the motor 50, the electrical means 49 to connect the motor 50 to the rechargeable battery pack 60, and the mechanical/structural means 46A for connecting the support band 46 to the motor mount structure 42; a motor mount structure 42; a support band 46 aka fan ring; electric motors 50; a means 51 to connect the rechargeable battery pack 60 to the a lightweight support frame 64; a propeller assembly 55 a rechargeable battery pack 60; a pilot 100 support structure 63 a lightweight support frame 64; a harness 70; a means 71 for removably connecting harness 70 to lightweight support frame 64; a back shoulder rest 73; an optional landing skid 75; a structure 76 at the support band 46 to connect one Special Electric JetPack device 31 to a second or third, etc. and a pilot 100. Other components present are similar to those depicted in the other sketches within this specification and are included by reference.

The details mentioned here are exemplary and not limiting. Other specific components and manners specific to describing an Electric Jetpack Device can be added as a person having ordinary skill in the field of VTOL aircraft, s, and electrical propulsion systems.

OPERATION OF THE PREFERRED EMBODIMENT

The Electric Jetpack Device 31 Personal Electric Helicopter device with an integral wind turbine recharging capability has been described in the above embodiment. The manner of how the device operates is described below. One notes well that the description above and the operation described here must be taken together to fully illustrate the concept of the device. The preferred embodiment of the Electric JetPack Device is a belt-like cluster Electric Jetpack Device comprised of: (a) a cluster of small, multiple electric JetPack thrusters, each thruster including (1) an external, lightweight support band; (2) a support structure including a motor support, an electric motor, at least one propeller, a means for removably securing the electric motor to the support structure, at least one rechargeable electric battery, a means for removably securing the electric battery to the support structure, a means for mechanically interconnecting the propeller and motor, and a means for electrically connecting the at least one rechargeable battery pack to the electric motor; and (3) a means for structurally interconnecting the support structure, the support band, and the fiber duct; (b) a pilot framework made of durable materials and including a lightweight support structure; a pair of handles pivotally secured to the lightweight support structure by a set of pivotal connectors/pivot points; a flight controller, used to manage a thrust from the propeller, the flight controller being mechanically secured to at least one of the handles and electrically connected to the ESC; and a harness, in which a pilot is strapped, connected to the lightweight support structure; and (c) the at least one rechargeable electric battery pack whereby the battery pack is electrically connected and managed/controlled by an Electronic Speed Controller (ESC), which is managed by the flight controller. The alternative embodiment replaces the belt-like cluster of small, multiple electric JetPack thrusters with at least one thruster duct including an external, lightweight carbon fiber duct.

The Electric Jetpack Device 31 operates as described here. The device is carried by an average human or mounted to landing skids. It is capable of flying for several minutes per charge, depending on the number of batteries and energy density of the batteries being carried. The current preferred embodiment uses either 4 or 8, 48-volt batteries, powering two 90-100-volt motors, one in each duct. Power is from the batteries connected to the drive motors and managed through a 300-500-amp Electronic Speed Controller (ESC). The ESC is managed by a flight controller (like a simple stick with power control buttons/toggles. The Flight Controller balances thrust, and limits roll from side to side. The ESCs then drive the motors, which turn an approximate 33.75-inch, 3 bladed propeller in a 34" inch, carbon-fiber duct. The directional control of the craft's direction is effectuated by moving handles that are moveably connected to pivot points, and the pivot points are mounted to an aluminum frame. The pivots tilt the ducts (containing the propellers and motors) slightly forward or back. Tilting the right duct forward and left duct back induces a yaw to the left. Opposite induces a yaw to the right. Both handles pushed back, tilting the ducts forward, induce forward flight, while both handles pushed forward—tilting the ducts back—induce backward flight. Altitude is managed by throttle, which may be attached to either one of the handles. The frame is connected to a harness and the harness is what the pilot is strapped into. The device or craft, with 4, 48-volt batteries, weighs less than 70 pounds. Therefore, with a 200-pound pilot, it can (as the prototype indicates) fly for approximately 2 minutes per charge. Additional batteries can be added, currently allowing up to fourteen (14) minutes of flight time with a 200-pound pilot. The craft currently will produce a total of 394 pounds of thrust/lift. A people and device load of 70 pounds equals approximately 270 pounds to the lift to weight ratio is 394/270-1.45. This shows a ratio that permits a very good control ratio for the Electric Jetpack Device 31. Note well that the uniqueness of the Jetpack includes: That the JetPack has multiple electric ducted or clustered electric jets to create enough/sufficient controlled thrust with battery power alone. In addition, the device with its turbines is electric powered and not powered by combustible fuels so there is virtually no dealing with heat, exhaust, and noise with these clustered small electric Jet-Packs. Further, the device is wearable by an individual and fully portable. It has ducts that assist in thrust and protect pilot from open blade hazards—so provides safe wearability as compared to many other current Electric Vertical Take Off and Landing (EVTOL) personal crafts.

The device 31 is also modular and can be connected mechanically to another device 31 in the front or rear, creating a "quadcopter" setup. Here the Flight Controller unit is programmed to fly the now coupled 2-person craft, as a quadcopter. Additional modules can be added to carry more people and/or cargo with the Flight Controller software modified accordingly. Optionally, the device 31 can also use motors that can act as generators (reference the "VertiPod" U.S. Pat. No. 9,440,736 issued to Pete Bitar, Sep. 13, 2016) and spun backwards in the wind to generate power to recharge its batteries, through a power management system.

FIGS. 12 A through 12 D are views of a general prototype 35 Electric Jetpack Device 31 being operated by moving the thruster ducts 40-A and 40-B with the handles 65 for guidance. FIG. 12 A show both thrusters 40-A and 40-B essentially vertical aligned/perpendicular with the ground or horizon. Here the thrust is straight down, and the device 31 travels vertically upward. FIG. 12 B shows both thrusters 40-A and 40-B essentially tipped forward and aligned angularly with the ground or horizon. Here the thrust is rearwardly exhausted and the device 31 travels essentially forward and a little upward. FIG. 12 C shows both thrusters 40-J and 40-B essentially tipped rearward and aligned angularly with the ground or horizon. Here the thrust is forwardly exhausted and the device 31 travels essentially backward and a little upward. FIG. 12 D shows thrusters 40-J is essentially tipped reward and thruster 40-B tipped forward and both 40-A and 40-B are somewhat aligned angularly with the ground or horizon. Here the thrust is a mixed direction rearward and forward so that the device 31 travels essentially circularly to the right and a little upward (left if the directions of 40-A and 40-B are reversed).

In FIG. 3 C, Step 1 the prototype 35 of the general Electric Jetpack device 31 is separate from the pilot 100 and "waiting on stand-by" to be called or summonsed by the pilot 100. The pilot communicates electronically to the device 35 and the device 31, 35 starts up and automatically is controlled by the controller 66 and Electronic Speed Controller (ESC) 69, which is managed by the flight controller 66, and moves toward the pilot 100. In Step 2, the pilot 100 engages and straps on the harness 70 to take full control of the device 31, 35. It is intended also that the system 31 will provide that the device is "summon able", allowing the operator, pilot 100 to use a phone or handheld, helmet-mounted or other portable device to transmit a signal to the Jetpack 31, allowing it to fly to the user and either land in proximity to the user or hover, allowing the user to attach to it, and for the device to fly the human 100 from that point. This would be accomplished through the device's controller 66, 69, which can also be used for unoccupied drones/UAVs/multicopters that would control the craft in the same way, for example, a drone has a "return to home" feature. This summon ability would allow the device 31 to be in proximity to the user 100, say in a vehicle or at a base station, on a charger, and then come to the user when summoned, with a relatively full charge (depending on distance to the user), and on-demand such that the user 100 would not need to be carrying the Jetpack 31 in order to have quick access to it. This summon ability could also be in the form of being dropped from another aircraft or balloon, or even something satellite mounted, allowing for a re-entry vehicle and heat shield in the case of something dropped from space.

The summoning system would use the summoning device (phone, computer, smartwatch, etc.) to transmit a coded signal either through radio waves directly to the Jetpack 31, or through the internet and a broadband connection. The Jetpack 31 could be on stand-by to receive such a signal, requiring it to be in minimal powered-on mode, which could be sustained by a small battery and/or solar panel, or through its charging connection. The Jetpack's controller 66, 69 would receive the summon signal and then use a mapping program to find a clear path to the summoning user. The Jetpack 31 would use collision-avoidance systems (radar/LIDAR/ultrasound) as are common on multicopter drones, to navigate around obstacles, and make its way to the user. Upon arrival, it will either land on the ground next to the user 100, as pre-programmed by the user, or would hover behind the user, allowing the user 100 to simply strap on the harness 70 of the craft without lifting any weight. Once strapped in, the craft would switch to pilot-controlled flight, allowing the pilot 100 to fly the craft with him or her in it.

Many uses are anticipated for an Electric Jetpack Device 31. Some examples, and not limitations, are shown in the following Table.

| ITEM | DESCRIPTION |
| --- | --- |
| 1 | Short range personal transportation |
| 2 | Emergency/disaster relief |
| 3 | Fire watch |
| 4 | Military assist (sniper, recon, SWAT team etc.) |
| 5 | Search and rescue |
| 6 | Military and Homeland security sighting needs for security operations |
| 7 | Sport vehicle flying |
| 8 | Cattle and livestock herding |
| 9 | Power line inspection |
| 10 | Building inspection |

With this description it is to be understood that the Electric Jetpack Device is not to be limited to only the disclosed embodiment of product. The features of the Electric Jetpack Device are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

The present invention contemplates modifications as would occur to those skilled in the art. While the disclosure has been illustrated and described in detail in the figures and the foregoing description, the same is to be considered as illustrative and not restrictive in character, it being understood that only selected embodiments have been shown and described and that all changes, modifications and equivalents that come within the spirit of the disclosures described heretofore and or/defined by the following claims are desired to be protected.

What is claimed is:

1. A belt-like cluster Electric Jetpack Device comprised of:
   (a) a cluster of small, multiple electric JetPack thrusters, each thruster including
      (1) an external, lightweight support band;
      (2) a support structure including a motor support, an electric motor, at least one propeller, a means for removably securing the electric motor to the support structure, at least one rechargeable electric battery, a means for removably securing the electric battery to the support structure, a means for mechanically interconnecting the propeller and motor, and a means for electrically connecting the at least one rechargeable battery pack to the electric motor; and
      (3) a means for structurally interconnecting the support structure, the support band, and a fiber duct;
   (b) a pilot framework made of durable materials and including a lightweight support structure; a pair of handles pivotally secured to the lightweight support structure by a set of pivotal connectors/pivot points; a flight controller, used to manage a thrust from the propeller, the flight controller being mechanically secured to at least one of the handles and electrically connected to the ESC; and a harness, in which a pilot is strapped, connected to the lightweight support structure; and
   (c) the at least one rechargeable electric battery pack whereby the battery pack is electrically connected and managed/controlled by an Electronic Speed Controller (ESC), which is managed by the flight controller
   wherein the cluster of small, multiple electric JetPack thrusters are wearable and portable by a pilot; the thrusters are quieter and have no combustion exhaust heat; and
   the thrusters are safer without the larger propeller and open blade hazards.

2. The belt-like cluster Electric Jetpack Device in claim 1 being further comprised of an optional landing skid that is removably connected to the pilot framework
   wherein the device is freestanding.

3. The belt-like cluster Electric Jetpack Device in claim 1 wherein the at least one battery pack material is selected from a group consisting of Nickle Cadmium, Nickle Metal Hydride, Lithium Ion, Small and sealed lead acid, Lithium sulfur, Sodium-ion, Thin film lithium, Zinc-bromide, Zinc-cerium, Vanadium redox, Sodium-sulfur, Molten salt, and Silver-zinc.

4. The belt-like cluster Electric Jetpack Device in claim 1 wherein the durable materials for the pilot framework is selected from a group consisting of steel, steel alloys, titanium, aluminum, and composite metal.

5. The belt-like cluster Electric Jetpack Device in claim 1 wherein the means for structurally interconnecting the support structure, the support band, and the fiber duct is selected from a group consisting of welding, brazing, threaded fasteners, apertures/clips/and cotter pins, and epoxy.

6. The belt-like cluster Electric Jetpack Device in claim 1 is further comprising controls to provide a summons feature
wherein an operator can summons a remote Electric Jetpack and bring it to a location of the operator for use.

7. An Electric Jetpack Device comprised of:
(a) at least one thruster duct including
(1) an external, lightweight carbon fiber duct;
(2) a support band;
(3) a support structure including a motor support, an electric motor, at least one propeller, a means for removably securing the electric motor to the support structure, at least one rechargeable electric battery, a means for removably securing the electric battery to the support structure, a means for mechanically interconnecting the propeller and motor, and a means for electrically connecting the at least one rechargeable battery pack to the electric motor; and
(4) a means for structurally interconnecting the support structure, the support band, and the fiber duct;
(b) a pilot framework made of durable materials and including a lightweight support structure; a pair of handles pivotally secured to the lightweight support structure by a set of pivotal connectors/pivot points; a flight controller, used to manage a thrust from the propeller, the flight controller being mechanically secured to at least one of the handles and electrically connected to the ESC; and a harness, in which a pilot is strapped, connected to the lightweight support structure; and
(c) the at least one rechargeable electric battery pack whereby the battery pack is electrically connected and managed/controlled by an Electronic Speed Controller (ESC), which is managed by the flight controller.

8. The Electric Jetpack Device in claim 7 being further comprised of an optional landing skid that is removably connected to the pilot framework
wherein the device is freestanding.

9. The Electric Jetpack Device in claim 7 wherein the fiber duct is made of an aramid fiber that prevents spall damage.

10. The Electric Jetpack Device in claim 7 wherein the at least one battery pack material is selected from a group consisting of Nickle Cadmium, Nickle Metal Hydride, Lithium Ion, Small and sealed lead acid, Lithium sulfur, Sodium-ion, Thin film lithium, Zinc-bromide, Zinc-cerium, Vanadium redox, Sodium-sulfur, Molten salt, and Silver-zinc.

11. The Electric Jetpack Device in claim 7 wherein the durable materials for the pilot framework is selected from a group consisting of steel, steel alloys, titanium, aluminum, and composite metal.

12. The Electric Jetpack Device in claim 7 wherein the means for structurally interconnecting the support structure, the support band, and the fiber duct is selected from a group consisting of welding, brazing, threaded fasteners, apertures/clips/and cotter pins, and epoxy.

13. The Electric Jetpack Device in claim 7 being further comprised of a control system to use the device in a vertical position as a wind catcher in order to recharge the rechargeable batteries.

14. The Electric Jetpack Device in claim 7 is further comprising controls to provide a summons feature
wherein an operator can summons a remote Electric Jetpack and bring it to a location of the operator for use.

15. The Electric Jetpack Device in claim 7 being further comprised a framework for mechanically connecting a first Electric Jetpack device to a second Electric Jetpack device
Wherein a set of the first and the second Electric Jetpack devices coupled with the flight controller can enable a 2-person craft.

16. An Electric Jetpack Device comprised of:
(a) at least one thruster duct including
(1) an external, lightweight carbon fiber duct whereby the Fiber duct is made of an aramid fiber to prevent spall damage;
(2) a support band;
(3) a support structure including a motor support, an electric motor, at least one propeller, a means for removably securing the electric motor to the support structure, at least one rechargeable electric battery, a means for removably securing the electric battery to the support structure, a means for mechanically interconnecting the propeller and motor, and a means for electrically connecting the at least one rechargeable battery pack to the electric motor; and
(4) a means for structurally interconnecting the support structure, the support band, and the fiber duct;
(b) a pilot framework made of durable materials and including a lightweight support structure; a pair of handles pivotally secured to the lightweight support structure by a set of pivotal connectors/pivot points; a flight controller, used to manage a thrust from the propeller, the flight controller being mechanically secured to at least one of the handles and electrically connected to the ESC; and a harness, in which a pilot is strapped, connected to the lightweight support structure;
(c) the at least one rechargeable electric battery pack whereby the battery pack is electrically connected and managed/controlled by an Electronic Speed Controller (ESC), which is managed by the flight controller; and
(d) a landing skid that is removably connected to the pilot framework to enable the device to be freestanding.

17. The Electric Jetpack Device in claim 16 wherein the at least one battery pack material is selected from a group consisting of Nickle Cadmium, Nickle Metal Hydride, Lithium Ion, Small and sealed lead acid, Lithium sulfur, Sodium-ion, Thin film lithium, Zinc-bromide, Zinc-cerium, Vanadium redox, Sodium-sulfur, Molten salt, and Silver-zinc.

18. The Electric Jetpack Device in claim 16 wherein the durable materials for the pilot framework is selected from a group consisting of steel, steel alloys, titanium, aluminum, and composite metal.

19. The Electric Jetpack Device in claim 16 being further comprised of a control system to use the device in a vertical position as a wind catcher in order to recharge the rechargeable batteries.

20. The Electric Jetpack Device in claim 16 is further comprising controls to provide a summons feature wherein an operator can summons a remote Electric Jetpack and bring it to a location of the operator for use.

* * * * *